(12) United States Patent
Fein et al.

(10) Patent No.: US 7,909,567 B2
(45) Date of Patent: Mar. 22, 2011

(54) STRATUM DEPLOYMENT OF WIND TURBINES

(75) Inventors: Gene S. Fein, Lenox, MA (US); Edward Merritt, Lenox, MA (US)

(73) Assignee: Genedics Clean Energy, LLC, Pittsfield, MA (US)

( * ) Notice: Subject to any disclaimer, the term of this patent is extended or adjusted under 35 U.S.C. 154(b) by 860 days.

(21) Appl. No.: 11/739,974

(22) Filed: Apr. 25, 2007

(65) Prior Publication Data

US 2008/0152492 A1      Jun. 26, 2008

Related U.S. Application Data

(63) Continuation-in-part of application No. 11/645,109, filed on Dec. 22, 2006, now Pat. No. 7,525,210.

(51) Int. Cl.
*F03D 3/02* (2006.01)

(52) U.S. Cl. ............ 415/60; 416/120; 416/203; 415/907

(58) Field of Classification Search .............. 416/1, 120, 416/203; 415/1, 60, 4.4, 4.5, 907; 290/44, 290/55
See application file for complete search history.

(56) References Cited

U.S. PATENT DOCUMENTS

| | | |
|---|---|---|
| 3,971,454 A | 7/1976 | Waterbury |
| 4,117,900 A | 10/1978 | Amick |
| 4,119,863 A | 10/1978 | Kelly |
| 4,314,160 A | 2/1982 | Boodman et al. |
| 4,315,402 A | 2/1982 | Sadhukhan |
| RE31,156 E | 2/1983 | Dessert |
| 4,592,136 A | 6/1986 | Hirsch |
| 4,883,823 A | 11/1989 | Perry et al. |
| 5,075,564 A | 12/1991 | Hickey |
| 5,254,876 A | 10/1993 | Hickey |
| 5,272,378 A | 12/1993 | Wither |
| 5,296,746 A | 3/1994 | Burkhardt |
| 5,606,233 A | 2/1997 | Davis |
| 5,920,127 A | 7/1999 | Damron et al. |
| 6,391,205 B1 | 5/2002 | McGinnis |

(Continued)

FOREIGN PATENT DOCUMENTS

DE      102 19 062 A1    11/2003

(Continued)

OTHER PUBLICATIONS

International Preliminary Report on Patentability and Written Opinion, PCT/US2008/005168, mailing date Nov. 5, 2009.

(Continued)

*Primary Examiner* — Ninh H Nguyen
(74) *Attorney, Agent, or Firm* — Hamilton, Brook, Smith & Reynolds, P.C.

(57) ABSTRACT

Installing large-sized wind turbines creates numerous challenges and limitations, hindering acceptance of wind generated energy. With small-sized wind turbines, such hindrances are omitted or minimized. Sized ever smaller, more small-sized wind turbines may be installed per installation. Accordingly, a method and corresponding apparatus for maximizing wind energy gathering potential of a plurality of wind turbines, each wind turbine having a sweep height, for a given location is provided. The present invention includes sizing sweep heights of substantially all wind turbines of the plurality of wind turbines to intersect at least one horizontal plane unique from horizontal planes intersected by a sweep height of at least one immediately adjacent wind turbine. Because the sweep height of each wind turbine of the plurality is individually sized in a prescribed manner, the present invention maximizes the wind energy gathering potential of the plurality of wind turbines especially for deployment of small-sized wind turbines.

21 Claims, 13 Drawing Sheets

U.S. PATENT DOCUMENTS

| | | |
|---|---|---|
| 6,409,467 B1 | 6/2002 | Gutterman |
| 6,624,530 B1 | 9/2003 | Toulon |
| 6,809,432 B1 | 10/2004 | Bilgen |
| 6,882,059 B1 | 4/2005 | DePaoli |
| 6,897,575 B1 | 5/2005 | Yu |
| 6,959,993 B2 | 11/2005 | Gross et al. |
| 7,098,553 B2 | 8/2006 | Wiegel et al. |
| 7,192,146 B2 | 3/2007 | Gross et al. |
| 7,193,332 B2 | 3/2007 | Spinelli |
| 7,226,536 B2 | 6/2007 | Adams |
| 7,226,542 B2 | 6/2007 | Zemel et al. |
| 7,339,286 B1 | 3/2008 | Chen |
| 7,434,636 B2 | 10/2008 | Sutherland |
| 7,453,164 B2 | 11/2008 | Borden et al. |
| 2004/0113291 A1 | 6/2004 | Klausner et al. |
| 2004/0159536 A1 | 8/2004 | Kamen et al. |
| 2005/0230238 A1 | 10/2005 | Klausner et al. |
| 2006/0113118 A1 | 6/2006 | Kim |
| 2006/0137348 A1 | 6/2006 | Pas |
| 2006/0171798 A1 | 8/2006 | Yamamoto et al. |
| 2007/0138797 A1 | 6/2007 | Reidy et al. |
| 2007/0284885 A1 | 12/2007 | Menges |
| 2008/0054638 A1 | 3/2008 | Greene et al. |
| 2008/0148549 A1 | 6/2008 | Fein et al. |
| 2008/0148732 A1 | 6/2008 | Fein et al. |
| 2008/0148733 A1 | 6/2008 | Fein et al. |
| 2008/0149302 A1 | 6/2008 | Fein et al. |
| 2008/0149403 A1 | 6/2008 | Fein et al. |
| 2008/0149573 A1 | 6/2008 | Fein et al. |
| 2008/0150284 A1 | 6/2008 | Fein et al. |
| 2008/0150286 A1 | 6/2008 | Fein et al. |
| 2008/0150288 A1 | 6/2008 | Fein et al. |
| 2008/0150289 A1 | 6/2008 | Fein et al. |
| 2008/0150290 A1 | 6/2008 | Fein et al. |
| 2008/0150291 A1 | 6/2008 | Fein et al. |
| 2008/0150295 A1 | 6/2008 | Fein et al. |
| 2008/0150296 A1 | 6/2008 | Fein et al. |
| 2008/0150298 A1 | 6/2008 | Fein et al. |
| 2008/0154800 A1 | 6/2008 | Fein et al. |
| 2008/0154801 A1 | 6/2008 | Fein et al. |
| 2008/0163919 A1 | 7/2008 | Fein et al. |
| 2008/0196758 A1 | 8/2008 | McGuire |

FOREIGN PATENT DOCUMENTS

| | | |
|---|---|---|
| WO | WO 2003/064852 | 8/2003 |
| WO | WO 2005/052362 | 6/2005 |
| WO | WO 2006/121414 A | 11/2006 |
| WO | WO 2006/138516 A | 12/2006 |
| WO | WO 2007/027765 | 3/2007 |
| WO | WO 2008/079369 | 7/2008 |
| WO | WO 2008/115479 A2 | 9/2008 |
| WO | WO 2008/133872 A2 | 11/2008 |
| WO | WO 2008/136901 A2 | 11/2008 |

OTHER PUBLICATIONS

Beyer, et al., "A Procedure for the Choice of the Geometric Configuration of a Wind Farm," *DEWI Magazin*, Deutsches Windenergie Institut, Wilhelmshaven, DE, No. 6, pp. 55-61 (Feb. 1995).

Lissaman, et al., "Critical Issues in the Design and Assessment of Wind Turbine Arrays," *International Symposium on Wind Energy Systems*, vol. P01, pp. 411-423 (Sep. 1982).

Frandsen, S., "On the Wind Speed Reduction in the Center of Large Clusters of Wind Turbines," *J. of Wind Engineering and Industrial Aerodynamics*, 39(1-3): 251-265 (May 1992).

International Search Report, PCT/US2008/005168, mailing date Feb. 18, 2009.

Holmes, Andrew S., et al., "Axial-Flux Permanent Magnet Machines for Micropower Generation," Journal of Microelectrical Systems, vol. 14, No. 1, Feb. 2005.

Zhong Lin Wang and Jinhui Song, "Piezoelectric Nanogenerators Based on Zinc Oxide Nanowire Arrays," Science, vol. 312, Apr. 14, 2006.

www.metropolismag.com, 6 pages, retrieved from Internet Apr. 19, 2007.

www.greencarcongress.com, 4 pages, retrieved from Internet Apr. 19, 2007.

www.panasonic.co.jp, 8 pages, retrieved from Internet Jan. 26, 2007.

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desalination," *Solar Energy* 75(5), pp. 375-379 (Nov. 1, 2003).

Garcia-Rodriguez, L., "Seawater Desalination Driven by Renewable Energies: A Review," *Desalination* 143(2), pp. 103-113 (May 20, 2002).

Kalogirou, S.A., "Seawater Desalination Using Renewable Energy Sources," *Progress in Energy and Combustion Science* 31(3), pp. 242-281 (Jan. 1, 2005).

Belessiotis, V., et al., "The History of Renewable Energies for Water Desalination," *Desalination 128*, pp. 147-159 (2000).

Awerbuch, L., et al., "Geothermal Energy Recovery Process," *Desalination 19*, pp. 325-336 (1976).

International Search Report for PCT/us2008/006034, date of mailing Oct. 24, 2008.

STRATUM DEPLOYMENT OF WIND TURBINES

RELATED APPLICATION

This application is a Continuation-in-Part of U.S. application Ser. No. 11/645,109 entitled "SYSTEM AND METHOD FOR CREATING A NETWORKED INFRASTRUCTURE DISTRIBUTION PLATFORM OF FIXED AND MOBILE SOLAR AND WIND GATHERING DEVICES" filed on Dec. 22, 2006 now U.S. Pat. No. 7,525,210. The entire teachings of the above application are incorporated herein by reference.

BACKGROUND OF THE INVENTION

A wind-powered turbine, or simply wind turbine, generates electrical power, which can be delivered to an existing electricity grid system via an interconnection or which may be used to directly power an individual home, business or utility. Wind turbines used to gather large amounts of power (e.g., in the megawatt range) are large structures, typically 100 feet high or higher.

SUMMARY OF THE INVENTION

Currently, installations of large-sized wind turbines, on the order of 100 feet or more, dot the landscape of the planet. These large-sized wind turbines are often located in remote fields, out to sea, or on private property away from public infrastructure.

Installations of small-sized wind turbines and other wind energy gathering devices, in the 5 to 30 foot range, are typically utilized in one of three deployments. The first deployment features clusters of small to mid-sized wind turbines set up in remote windy areas, such as, the desert environment near Palm Desert in California. The second deployment features isolated powering of homes and small businesses, such as those in remote artic or extreme cold climates where heating and cooling infrastructures do not exist. In another example, such isolated powering augments at the micro-use level power consumption by homes and small businesses. The third deployment features isolated powering of entities for government utilities, such as isolated powering of single light stands at the Hanauma Bay National Park public parking lot in Oahu, Hi.

Conventional deployments address power plant and isolated use models for generating and distributing wind generated energy or power. Large-sized wind turbines generate megawatt quantities of power for local use or for interconnecting back to an electricity or utility grid system. Small-sized wind energy generation systems, on the other hand, are typically used to solve local power issues, such as street lights, home power needs or business power needs. Some small-sized wind energy generation systems have the ability to be interconnected to a utility grid system for the purpose of selling wind generated energy generated by the wind energy gathering system to a public or private utility.

Unfortunately, existing conventional uses have certain limitations in distribution and deployment. Acceptance of large-sized wind turbines is faced with several challenges. For example, environmentalists fear that the noise and size of wind turbines will disrupt both scenic and habitat conditions. Also of environmental concern is the threat to the well being of birds that may be caught in the blades of large wind turbines. The United States Department of Defense too has voiced its concern that large-sized wind turbines interfere with radar signals and tracking.

Large-sized wind turbines or turbine systems which are placed far away from existing infrastructures are expensive. Large expenses are incurred not only in transporting such systems to remote locations, but also building the necessary infrastructure to carry wind generated energy from these locations to where the energy is consumed.

Finally, a large-sized wind turbine represents a single, large volatile investment. If wind is not present or wind currents change, a large-sized wind turbine is a poor investment because the wind turbine will not generate enough power to recover the investment. Also, because a large-sized wind turbine is a large, single entity, if the wind turbine breaks for any reason, no wind generated energy can be generated. Large-sized turbines also require labor intensive maintenance and monitoring. The lifespan for a large-sized wind turbine is 20 years. The waste associated with manufacturing, installation and decommissioning of a large-sized wind turbine is another environmental issue to contend with.

In contrast, small-sized wind turbines used in isolated areas for private homes, businesses, and individuals are a great way to introduce clean energy on a unit-by-unit grass roots level. Furthermore, small-sized wind turbines can be easily connected to multiple direct sources or various grid interconnection points for distribution.

In some applications, components for small-sized wind turbines, such as tiny wiring forming a wiring grid on the micrometer scale, have been shown to have super conductive properties which may help increase the energy gathering efficiency of small-sized wind turbines.

Small-sized wind turbines on the order of an eighth of an inch and greater may be made using standard molding and forming processes. Small-sized wind turbines in range of 50 micrometers may be made using advanced lithography and laser tools.

Because of its small size, small-sized wind turbines may allow for deployment of billions of wind turbines in spaces where larger-sized wind turbines can not fit, such as curved guardrails along roadways, on top of vehicles, or mounted vertically or horizontally in positions which would not be functional for larger-sized wind turbines.

The functions of small-sized wind turbines may be wide ranging. For example, wind generated energy generated by small-sized wind turbines affixed to winter jackets and gloves may be used to generate heat. In another example, large strips of installable sheets of small-sized turbines may be rolled out or otherwise deployed along public and private highways to form wind generation systems. Installed on medians or outside of breakdown lanes, such a wind generation system of small-sized wind turbines offers numerous advantages.

For example, private highways and municipalities have existing maintenance crews as well as existing relationships with contracted infrastructure building providers who can be trained to install the wind generation systems along specified parts of roadways.

Second, the wind power generation systems can be small and noiseless, small enough to fit millions or billions of small-sized wind turbines on a median between opposite sides of a divided highway with existing medians.

Third, the energy generated (wind generated energy) by the devices may be distributed directly to homes or businesses along the highway route, or to hydrogen conversion plants distributing directly to homes or businesses for powering the same. Distribution to hydrogen conversion plants for clean power from the electrolysis of hydrogen for filling stations along a highway, either utilizing hydrogen conversion at individual filling stations or at a conveniently located hydrogen conversion plant adjacent to the highway or roadway.

Fourth, other clean energy sources such as solar, geothermal and other heat conversion technologies may be used to create a multi-source clean energy 'power grid'. Such a multi-source clean energy power grid may be along with or in tandem with the 'grid' in place via potential for the connection of miles of wind power gathering, storage and transfer of generated power.

Fifth, these infrastructures benefit the wind power generator companies and benefit; the roadway owners via lease or easement revenue. Various products of manufacturer can benefit from an easily installed 'skin' or sheet of the small-sized wind turbines energy gathering material. Also these infrastructures provide a stable and consistent infrastructure project generating a service provider economy for clean energy production as well as the environment.

Sixth, roadways are a consistent source of wind and by having small wind energy capture devices close to the ground the wind energy capture devices, such as small noiseless spiral or helix-style turbines, enable the devices to capture wind energy generated by passing vehicles as well as atmospheric currents.

Seventh, the power generated by this system may also be connected to a grid system at many different and convenient points located very close to the existing grid infrastructure.

Embodiments of the present invention relate to creating a configuration of wind turbines. The configuration of wind turbines may be installed in a location for the purpose of gathering wind energy or power. The configuration of wind turbines may be installed in a manner which maximizes the number of functioning wind turbines installed within an area suitable for implementation. In addition, the configuration may also be installed in a manner which maximizes the wind energy gathering potential for a given area.

A method for installing, implementing or otherwise configuring a plurality of wind turbines of different sizes for maximizing a number of wind turbine installed in a given area or for maximizing the wind generated energy potential of a given area is hereinafter referred to as a "stratum implementation method." A corresponding apparatus is hereinafter referred to as a "stratum implementation of wind turbines" or "stratum configuration of wind turbines." The abbreviated forms "stratum implementation" and "stratum configuration, " are also used hereinafter.

In general, a stratum implementation of wind turbines finds an implementation of different sized wind turbines in close proximity to each other. By varying the size of wind turbines and forming a slope of wind turbines in the implementation and installation process regarding the wind turbines in relation to each other, the wind turbines are not impinging on each other in terms of the areas to be swept by the wind turbines and the possible swept area between the turbines is maximized.

Conceptually, think of the stratum implementation of wind turbines as a stratum of rock where one layer resides on an independent plane from another layer. In addition to the slope of wind turbine, there may also be an accretive gain in wind turbine installation configuration. By this it is meant that wind turbines and micro-sized wind turbines which stand gradually larger may be installed throughout most of an installation space, similar to a grass lawn that is cut in ascending to descending angles, where a sweeping element of a wind turbine sits on an independent plane for the proper spacing between a next turbine of substantially identical sweep height.

For example, rather than having two 20 foot wind turbines, which must be 40 feet apart, using the stratum implementation method, a ten foot wind turbine may be located within the horizontal and vertical sweeping clearance space or area between the two 20 foot turbines. In other words, using the stratum implementation method, an intermediate wind turbine is sized to horizontally and vertically clear immediately adjacent wind turbines. Again using the stratum implementation method, in between the 20 foot and 10 foot wind turbines, a series of smaller wind turbines may be installed with vertical and horizontal clearances of the sweeping areas in relation to other adjacent wind turbines.

In addition to straight line implementations, the stratum implementation may be used for horizontal and vertical row implementations, resembling corn rows if the corn were cut at ascending and descending levels. In this way, in a stratum implementation where more than a straight line or arrangement of wind turbines is possible, horizontal and vertical rows would take on the appearance of a series of gradual pyramids as the slope of the wind turbine came to points from horizontal and vertical directions at once.

As the wind turbines get smaller in size, more and more small-sized wind turbines can be fitted into the stratum implementation, until finally one more sheet of micro wind turbines can be laid across an entire stratum configuration, interrupted only by implementation of larger-sized turbines. In such a stratum implementation, one or more sheets of micro-sized wind turbines may be produced with openings which allow larger-sized wind turbines to fit through the sheets and around the micro-sized wind turbines. For example, during production, openings for larger-sized wind turbines may be stamped through a sheet or pre-molded into a sheet. Where such openings are stamped or pre-molded may be specified using a computer aided design (CAD) implementation design program.

A CAD implementation design program or other computer implemented design process may also be used to determine a stratum implementation of wind turbines. For example, given a particular physical location and the location of existing large-sized wind turbines, the computer implemented design process configures small-sized wind turbines into a stratum implementation suitable for installing with the existing large-sized wind turbines. The small-sized wind turbines are then installed around the previously installed large-sized wind turbines in accordance with the stratum implementation as determined by the design process. Because the small-sized wind turbines are installed after installing the large-sized wind turbine, this type of stratum configuration implementation may be referred to as post-installation.

Alternatively, one or more sheets of small-sized wind turbines may be manufactured in accordance with a stratum implementation as determined by the computer implemented design process. The manufactured sheets of small-sized wind turbines may then be installed around the previously installed large-sized wind turbines, much like laying tile around a pipe or other protrusion. In either example, the net result is a stratum implementation of wind turbines.

Accordingly, a method and corresponding apparatus for maximizing the wind energy gathering potential of a plurality of wind turbines for a given location, each wind turbine having a sweep height, includes sizing the sweep heights of substantially all wind turbines of the plurality of wind turbines to intersect at least one horizontal plane unique from horizontal planes intersected by a sweep height of at least one immediately adjacent wind turbine.

Alternatively, a method and corresponding apparatus for harnessing wind energy with a plurality of wind turbines, each wind turbine having a sweep height, includes sizing the sweep heights of substantially all wind turbines of the plurality of wind turbines to differ from a sweep height of immediately adjacent wind turbines.

In yet another alternative, a method and corresponding apparatus for harnessing wind energy with a plurality of wind turbines, each wind turbine having a sweep height, includes sizing sweep heights of a first wind turbine and at least one second wind turbine with substantially same sweep heights according to a horizontal spacing between the first wind turbine and the at least one second wind turbine, reducing the horizontal spacing, and repeating the sizing and the reducing at least until each wind turbine of the plurality of wind turbines is sized.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF THE INVENTION

A description of example embodiments of the invention follows.

Figure 1A:
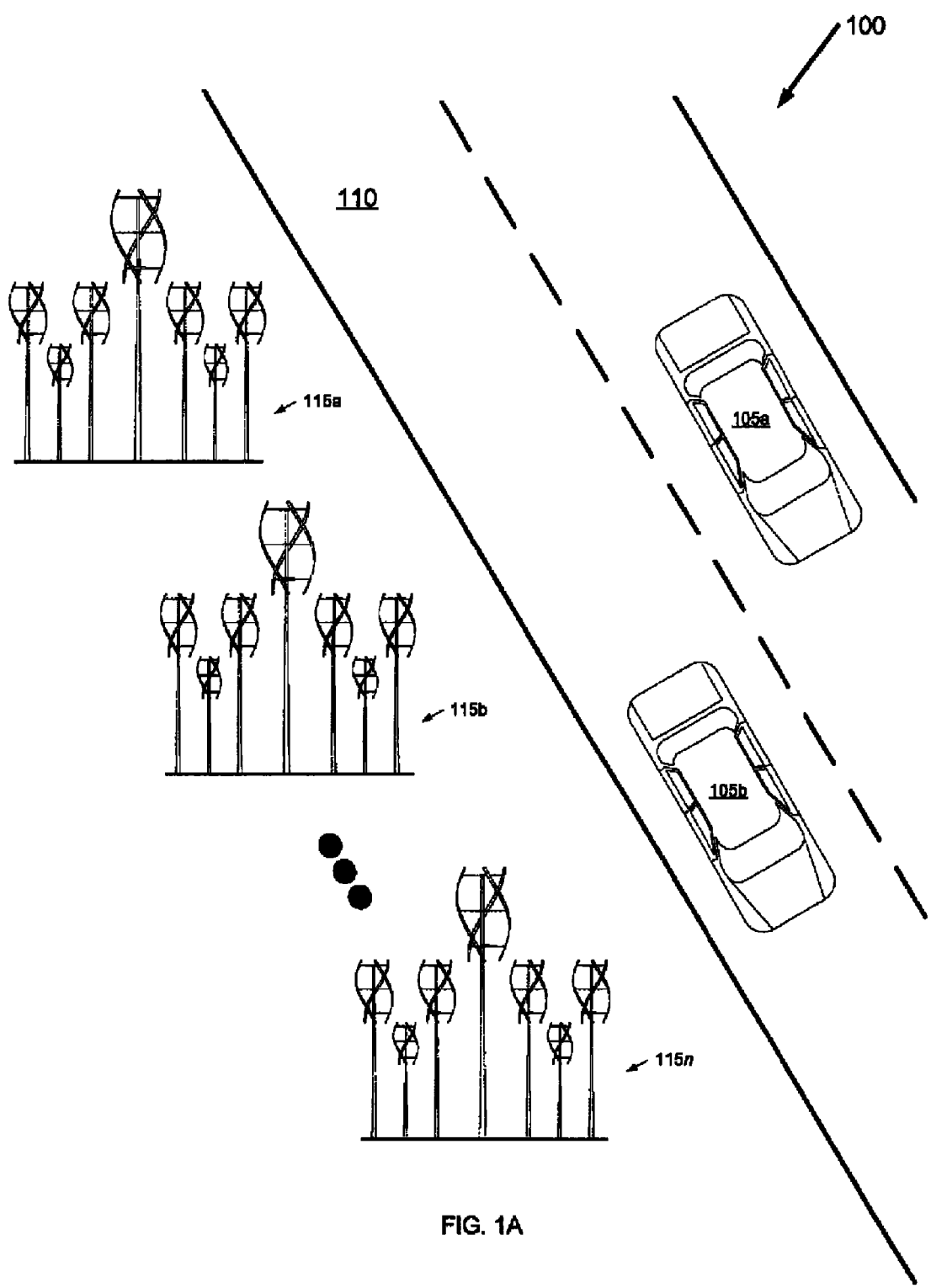
FIG. 1A is a view of an environment where example embodiments of the present invention may be deployed.

In FIG. 1A, in an example roadway system 100 for wind energy generation and distribution, vehicles 105a and 105b (e.g., an automobile, truck, etc.) travel along a roadway 110 (e.g., a road, highway, etc.). Situated or otherwise located alongside the roadway 110 are a plurality of wind turbines 115a, 115b, . . . 115n (generally 115). The plurality of wind turbines 115 gather wind energy from or created by a variety of sources.

For example, being situated alongside the roadway 110, the plurality of wind turbines 115 gather wind energy created by the vehicles 105a and 105b moving by the plurality of wind turbines 115 and causing air to move (so called, "dirty wind").

In another example, the plurality of wind turbines 115 gathers naturally occurring wind energy (e.g., atmospheric wind). In this way, wind energy is gathered (and thus wind generated energy is generated) even when there are no vehicles traveling along the roadway 110.

Furthermore the plurality of wind turbines 115 gathers wind energy from incident wind, i.e., air movement or current falling or striking the plurality of wind turbines 115 or some portion of the plurality of wind turbines 115. For example, wind energy may be gathered from a main current of air, such as air moving along the line of travel of the vehicles 105a and 105b, striking the plurality of wind turbines 115 or some portion of the plurality of wind turbines 115. In another example, wind energy may be gathered from a current of air moving contrary to a main current of air (i.e., an eddy) striking the plurality of wind turbines 115 or some portion of the plurality of wind turbines 115.

Wind or more precisely a current of air may be infinitely divided into smaller currents of air. Furthermore, each individual current of air may be characterized with a directional vector, velocity and other physical characteristics. As such, one skilled the art will readily recognize principles of the present invention contemplate such individual currents of air and characteristics. For example, while it may be perceived at the human scale that air is not moving, at the granularity of an individual air current, air may nevertheless be moving from which wind energy may be gathered.

Accordingly, wind energy gathered from any combination of sources, such as atmospheric wind, and air movement caused by other vehicles or objects, as well as wind energy gathered from incident wind striking a plurality of wind turbines or some portion of a plurality of wind turbines is suitable for the present invention.

Because the plurality of wind turbines 115 is situated or otherwise positioned on part of a road or near to one or more roads, the potential installation footprint is hundreds of thousands of miles of available roadways. Compared to wind turbines located in remote areas, such as a hilltops, situating the plurality of wind turbines 115 on part of a road or near to one or more of roads allows for easier access for maintenance crews. Furthermore, there is greater access to a utility grid and additional direct powering opportunities to homes and businesses.

Additionally, by situating or otherwise locating the plurality of wind turbines 115 on part of a road or near to one or more roads to gather wind energy and generated wind generated energy, it may be said that a roadway network or system of wind generated energy is formed.

Figure 1B:
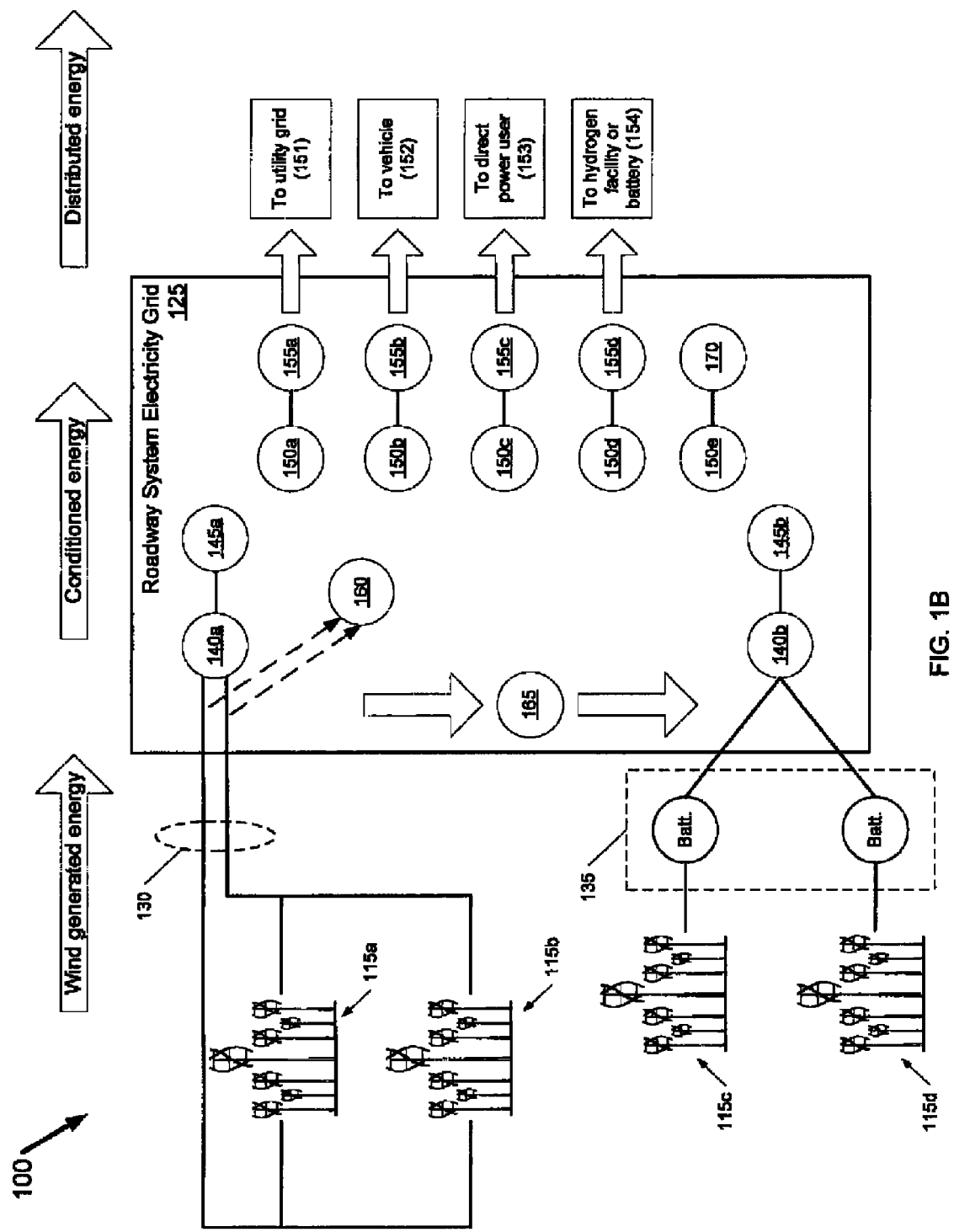
FIG. 1B is a block diagram of an example roadway system in which embodiments of the present invention may be an element.

FIG. 1B illustrates, in greater detail, the roadway system 100 of FIG. 1A. The plurality of wind turbines 115 are electrically connected, in parallel, to a roadway system electricity grid 125 by a power line 130. Alternatively, the plurality of wind turbines 115 is electrically connected to the roadway system electricity grid 125 by a battery pack system 135. Furthermore, the plurality of wind turbines 115 may be electrically connected to the roadway system electricity grid 125 in such a manner as to form a parallel circuit, a series circuit or a combination parallel and series circuit.

Wind generated energy is power conditioned by inverters 140a and 140b Electricity meters 145a and 145b measure an amount of wind generated energy which is gathered and generated by the plurality of wind turbines 115. As such, the roadway system electricity grid 125 measures an amount of conditioned wind generated energy provided by the plurality of wind turbines 115.

Wind generated energy generated by the plurality of wind turbines 115 and provided to the roadway system electricity grid 125 is distributed by the roadway system electricity grid 125 through distribution points 150a . . . e, generally 150. The distribution points 150 are configured to distribute wind generated energy to, for example, a utility grid 15, a vehicle 152, directly to a business or a home 153 or a hydrogen electrolysis and storage facility or a battery storage facility 154. As such, the roadway system electricity grid 125 is configured for mass distribution of electricity.

In contrast, a plurality of wind turbines located on private land (e.g., a field abutting farm land) is configured to provide wind generated energy for private consumption. That is, it is the intention of an entity, such as homeowner or a farmer to use such a plurality of wind turbines to produce wind generated energy for the entity's own use. For example, a homeowner installs a plurality of wind turbines next to the homeowner's house to reduce the cost of providing energy to the house. In another example, a farmer installs a plurality of wind turbines in a field to provide power for a well pump to irrigate an isolated parcel of farmland which has no access to utilities.

Consequently, with such situated plurality of wind turbines there is a neither a need nor desire to distribute the wind generated energy to others, i.e., to mass distribute the wind generated energy. Moreover, with such situated plurality of wind turbines there is neither a need nor desire for a roadway system electricity grid configured to mass distribute the wind generated energy, which is in stark contrast with the roadway system electricity grid 125 of the present invention.

Electricity meters 155a . . . d, generally 155 measure an amount of wind generated energy distributed to, for example, a direct power user, such as a home. As such, the roadway system electricity grid 125 measures an amount of conditioned wind generated energy provided by the roadway system electricity grid 125.

The roadway system electricity grid 125 may include, for example, a battery backup 160 to store wind generated energy in an event the roadway system electricity grid 125 fails or is otherwise inoperable. In this way, wind generated energy generated by the plurality of wind turbines 115 can be stored without substantial loss despite an inability to distribute such generated energy. The wind generated energy stored by the battery backup 160 may then be distributed once the roadway system electricity grid 125 is operable.

The roadway system electricity grid 125 may also include, for example, a switch 165 to pass, in an automated manner, wind generated energy from a first plurality of wind turbines to a second plurality of wind turbines based on use or distribution demand. For example, wind generated energy generated by a first plurality of wind turbines (e.g., 115a of FIG. 1A) may be distributed by the roadway system electricity grid 125 to a direct power load or user, such as a business or home. The amount of wind generated energy distributed to the direct power load may be insufficient to meet the present demands of the direct power load, e.g., an increase use of air conditioning. The roadway system electricity grid 125, sensing the increase demand from the direct power load, passes or reroutes wind generated energy generated by a plurality of wind turbines (e.g., 115b of FIG. 1A) to add or otherwise augment energy already being distributed to the direct power load. In this way, the roadway system electricity grid 125 is responsive to distribution demands. Alternatively, the roadway system electricity grid 125 may be programmed to distribute wind generated energy according to a projected or otherwise anticipated distribution demand. For example, during business hours, a demand for wind generated energy by businesses is higher than a demand for wind generated energy by homes. During non-business hours or weekends, however, the demand by homes is higher than the demand by businesses. As such, the roadway system electricity grid 125 may pass wind generated energy from a plurality of wind turbines near homes and distribute such power to businesses during business hours, and vice versa during non-business hours or weekends.

The roadway system electricity grid 125 may also include, for example, an energy distribution depot 170 to store, channel and recondition wind generated energy.

While the roadway system 100 illustrated in FIG. 1B gathers and distributes wind energy, other forms of energy may be gathered and distributed in addition to wind energy. For example, solar generated energy may be gathered and distributed, as described in a U.S. patent application Ser. No. 11/624,987 entitled "SYSTEM AND METHOD FOR CREATING A NETWORKED INFRASTRUCTURE DISTRIBUTION PLATFORM OF SOLAR ENERGY GATHERING DEVICES" filed Jan. 19, 2007 and assigned to Genedics LLC.

The plurality of wind turbines 115 are configured (arranged or otherwise positioned) in a configuration hereinafter referred to as a "stratum configuration." In general, a stratum configuration involves the sizing of sweep heights of a plurality of wind turbines. More specifically, in a first alternative, sweep heights are sized with respect to horizontal planes intersected by a sweep height of an immediately adjacent wind turbine, described in reference to FIGS. 2 and 3A-3F. In a second alternative, sweep heights are sized with respect to a sweep height of an immediately adjacent wind turbine, discussed in reference to FIGS. 4A-4C. In a third alternative, sweep heights are sized with respect to a horizontal spacing between a first wind turbine and a second wind turbine, described in reference to FIG. 5. As such, a stratum configuration is not the mere following of an underlying topology or support, such as land or a building. For example, deploying wind turbines with substantially similar sweep heights along a hillside slope, while producing a "layering effect," is not the same as a stratum configuration according to embodiments now being described.

Figure 2:
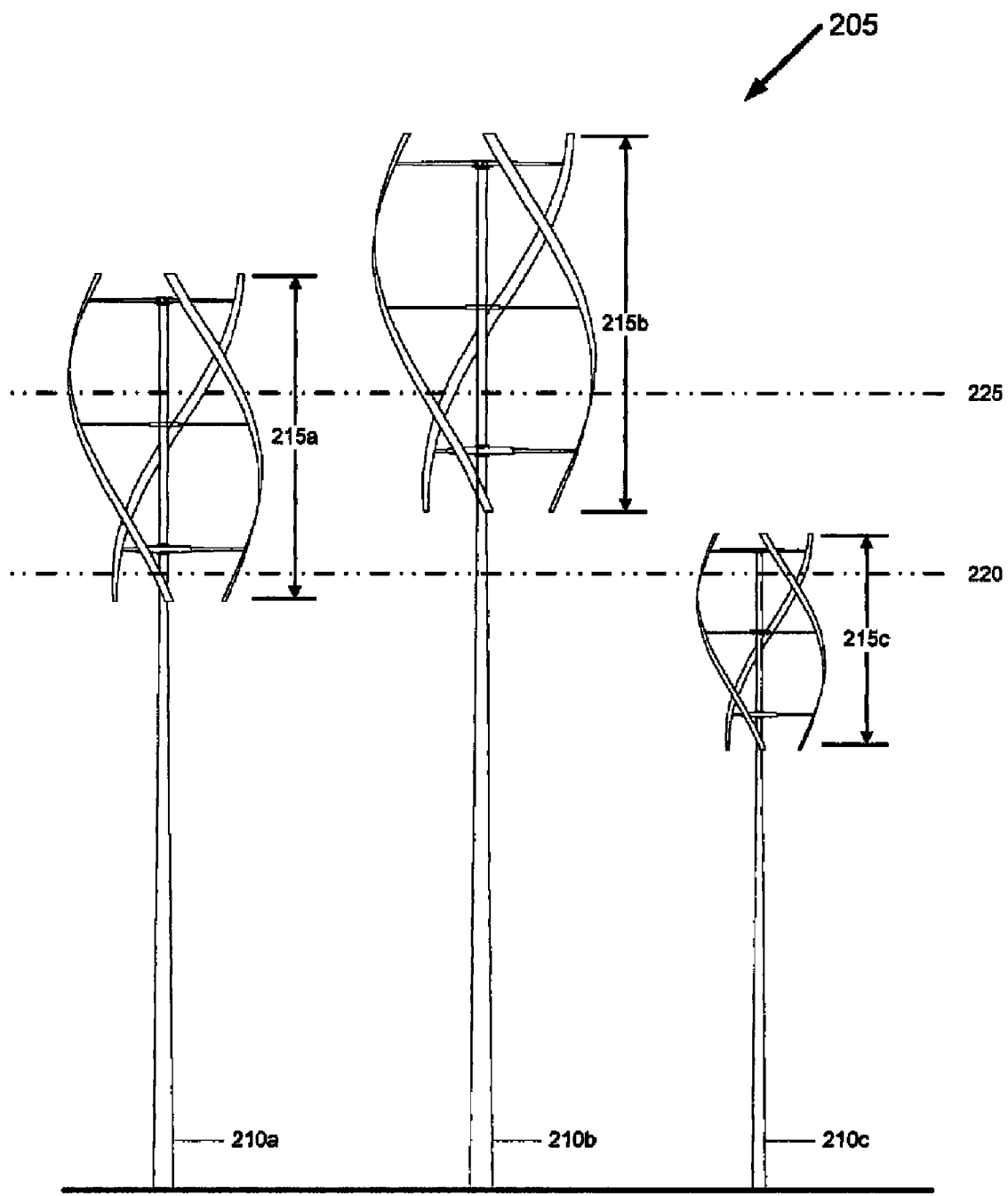
FIG. 2 is a diagram of an example stratum configuration, in accordance with an embodiment of the present invention.

In FIG. 2, an example stratum configuration 205 of a plurality of wind turbines includes a first wind turbine 210a, a second wind turbine 210b, and a third wind turbine 210c (generally, 210). Each of the wind turbines 210 has a respective sweep height 215a, 215b, and 215c (generally, 215). The sweep height 215 of each wind turbine 210 intersects an infinite number of planes which are all oriented perpendicular to the sweep height 215, hereinafter referred to as "horizontal planes." In the stratum configuration 205, the sweep heights 215 of each wind turbine 210 are sized to intersect at least one horizontal plane unique from horizontal planes intersected by a sweep height of at least one immediately adjacent wind turbine.

For example, immediately adjacent to the first wind turbine 210a with the first sweep height 215a is the second wind turbine 210b with the second sweep height 215b. The first sweep height 215a intersects a horizontal plane 220. In contrast, the second sweep height 215b, the sweep height of the immediately adjacent second wind turbine 210b, does not intersect the horizontal plane 220. As such, the horizontal plane 220 is a horizontal plane which differs or is otherwise unique from horizontal planes intersected by the second sweep height 215b. Furthermore, in the stratum configuration 205, the first sweep height 215a (and hence first wind turbine 210a) is sized to intersect this unique horizontal plane.

Note that the third sweep height 215c also intersects the horizontal plane 220. However, unlike the second wind turbine 210b, the third wind turbine 210c is not immediately adjacent to the first wind turbine 210a. As such, the horizontal plane 220 is a horizontal plane which is the same or is otherwise non-unique from horizontal planes intersected by the third sweep height 215c, the sweep height of a wind turbine not immediately adjacent to the first wind turbine 210a.

Returning to the first sweep height 215a, the first sweep height 215a further intersects a horizontal plane 225. The second sweep height 215b also intersects the horizontal plane 225. As such, between the first wind turbine 210a and the second wind turbine 210b, the horizontal plane 225 is not a horizontal plane unique from horizontal planes intersected by the first sweep height 215a or the second sweep height 215b. However, between the second wind turbine 210b and the third wind turbine 210c, also an immediately adjacent wind turbine to the second wind turbine 210b, the horizontal plane 225 is a horizontal plane unique from horizontal planes intersected by the third sweep height 215c.

In this way, in a stratum configuration, such as the stratum configuration 205 of FIG. 2, sweep heights of substantially all wind turbines of the configuration are each sized to intersect at least one horizontal plane unique from horizontal planes intersected by a sweep height of at least one immediately adjacent wind turbine. Variations of this principle are described below.

Figure 3A:
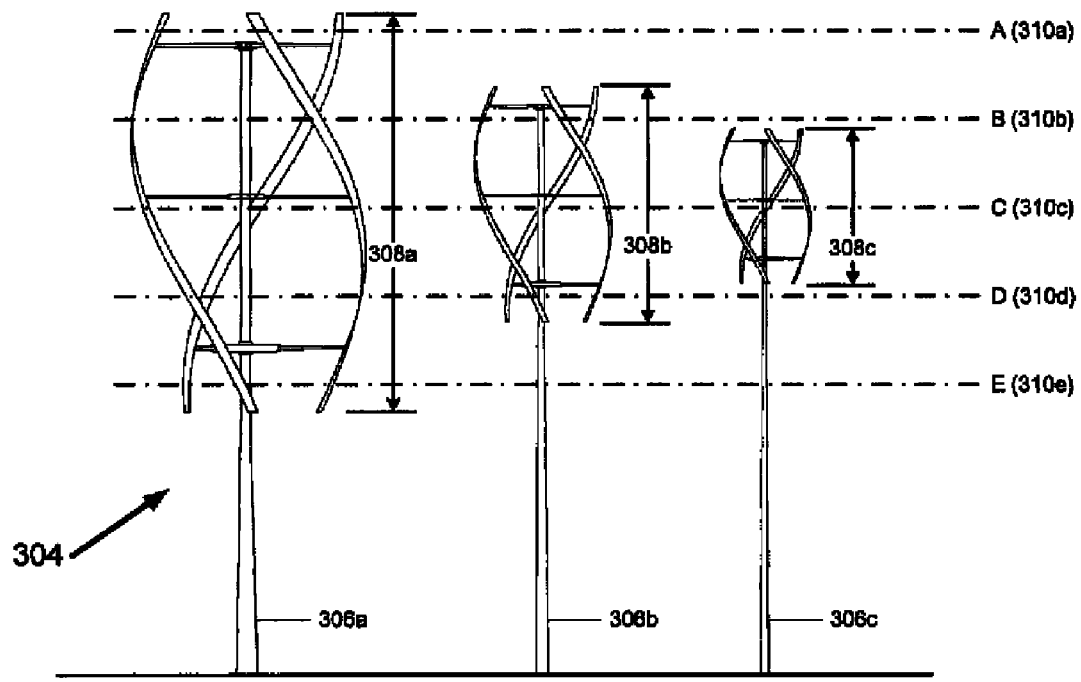
FIGS. 3A-F are diagrams of example stratum configurations with sweep heights sized with respect to horizontal planes intersected by a sweep height of an immediately adjacent wind turbine, in accordance with embodiments of the present invention.

In FIG. 3A, a stratum configuration 304 includes a first wind turbine 306a, a second wind turbines 306b, a third wind turbine 306c. The first wind turbine 306a is immediately adjacent to the second wind turbine 306b. The second wind turbine 306b is immediately adjacent to the first wind turbine 306a and the third wind turbine 306c. The third wind turbine 306c is immediately adjacent to the second wind turbine 306b.

The first wind turbine 306a has a first sweep height 308a which intersects horizontal planes "A" through "E" (310a-310e). The second wind turbine 306b has a second sweep height 308b which intersects the horizontal planes "B" through "D" (310b-310d). The third wind turbine 306c has a third sweep height 308c which intersects the horizontal plane "C" 310c.

Between the first wind turbine 306a and the second wind turbine 306b (a wind turbine immediately adjacent to the first wind turbine 306a) both the first sweep height 308a and the second sweep height 308b intersect the horizontal planes "B" through "D" (310b-310d). In other words, between the two wind turbines, the horizontal planes "B" through "D" (310b-310d) are not unique, but are common or otherwise shared.

The horizontal plane "A" 310a and the horizontal plane "E" 310e, however, are not shared between the first wind turbine 306a and the second wind turbine 306b, but are uniquely intersected by the first sweep height 308a. As such, in the stratum configuration 304, illustrated in FIG. 3A, the first sweep height 308a (and hence first wind turbine 306a) is sized to intersect at least two unique horizontal planes—the horizontal plane "A" 310a and the horizontal plane "E" 310e.

Between the second wind turbine 306b and the first wind turbine 306a both the first sweep height 308a and the second sweep height 308b intersect the horizontal planes "B" through "D" (310b-310d), as described above.

Between the second wind turbine 306b and the third wind turbine 306c, the second sweep height 308b and the third sweep height 308c both intersect the horizontal plane "C" 310C. The horizontal plane "B" 310b and the horizontal plane "D" 310d, however, are not shared between the second wind turbine 306b and the third wind turbine 306c, but are uniquely intersected by the second sweep height 308b. As such, in the stratum configuration 304, illustrated in FIG. 3A, the second sweep height 308b (an hence second wind turbine 306b) is sized to intersect at least two unique horizontal planes—the horizontal plane "B" 310b and the horizontal plane "D" 310d.

Between the second wind turbine 306b and the third wind turbine 306c both the second sweep height 308b and the third sweep height 306c intersect the horizontal plane "C" 310c, as described above. In fact, the third sweep height 308c intersects no horizontal plane which is unique from horizontal planes intersected by the first sweep height 308a and second sweep height 308b. As such, the third sweep height 308c (third wind turbine 306C) is sized not to intersect a horizontal plane unique from horizontal planes intersected by an immediately adjacent wind turbine the second wind turbine 306b.

In this way, sweep height of substantially all wind turbines of a stratum configuration, such as the stratum configuration 304 of FIG. 3A, are sized to intersect at least two horizontal planes unique from horizontal planes intersected by a sweep height of at least one immediate adjacent wind turbine.

Figure 3B:
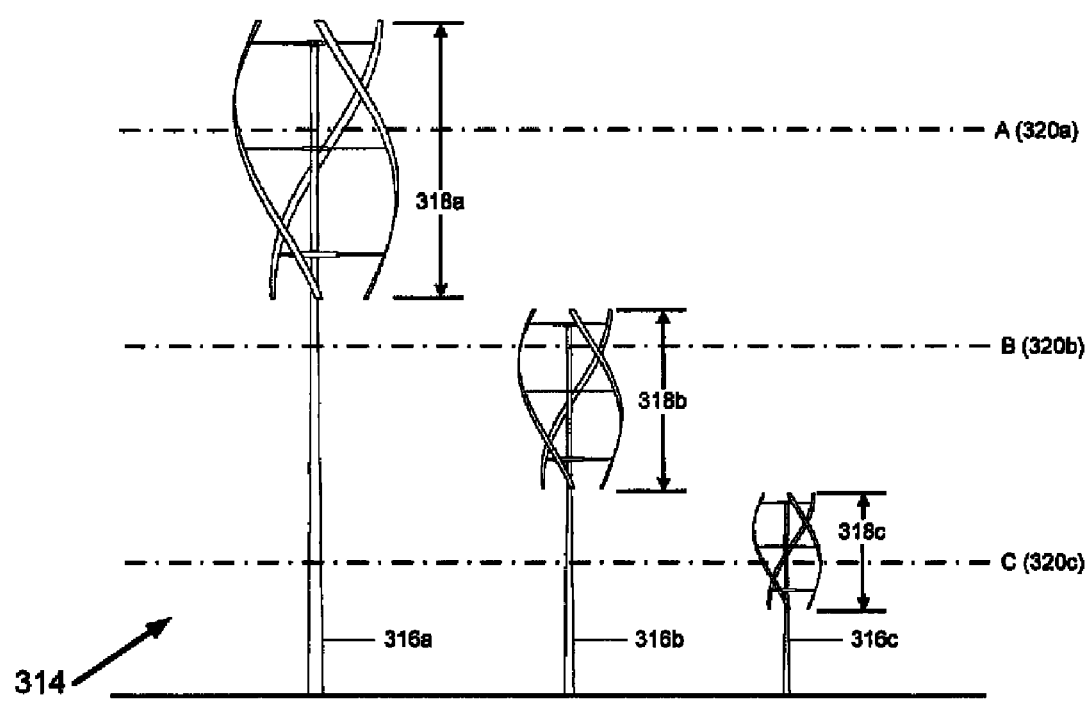

In FIG. 3B, a stratum configuration 314 includes a first wind turbine 316a, a second wind turbine 316b, and a third wind turbine 316c. The first wind turbine 316a is immediately adjacent to the second wind turbine 316b. The second wind turbine 316b is immediately adjacent to the first wind turbine 16a and the third wind turbine 316c. The third wind turbine 316c is immediately adjacent to the second wind turbine 316b.

The first wind turbine 316a has a first sweep height 318a which intersects a horizontal plane "A" 320a. The second wind turbine 316b has a second sweep height 318b which intersects a horizontal plane "B" 320b. The third wind turbine 316c has a third sweep height 318c which intersects a horizontal plane "C" 320c.

Between the first wind turbine 316a and the second wind turbine 316b (a wind turbine immediately adjacent to the first wind turbine 316a) neither the first sweep height 318a nor the second sweep height 318b intersect a common horizontal plane. All horizontal planes intersected by the first sweep height 318a are unique from horizontal planes intersected by the second sweep height 318b. In the example illustrated in FIG. 3B, the first sweep height 318a intersects the horizontal plane "A" 320a. No other sweep height intersects the horizontal plane "A" 320a.

Similarly, between the second wind turbine 316b and the third wind turbine 316c (a wind turbine immediately adjacent to the second wind turbine 316b) neither the second sweep height 318b nor the third sweep height 318c intersect a common horizontal plane. All horizontal planes intersected by the second sweep height 318b are unique from horizontal planes intersected by the third sweep height 318c. In the example illustrated in FIG. 3B, the second sweep height 318b intersects the horizontal plane "B" 320b. No other sweep height intersects the horizontal plane "B" 320b.

In this way, in a stratum configuration, such as the stratum configuration 314 of FIG. 3B, sweep heights of substantially all wind turbines of a stratum configuration are sized to intersect horizontal planes unique from horizontal planes intersected by a sweep height of at least one immediately adjacent wind turbine.

Figure 3C:
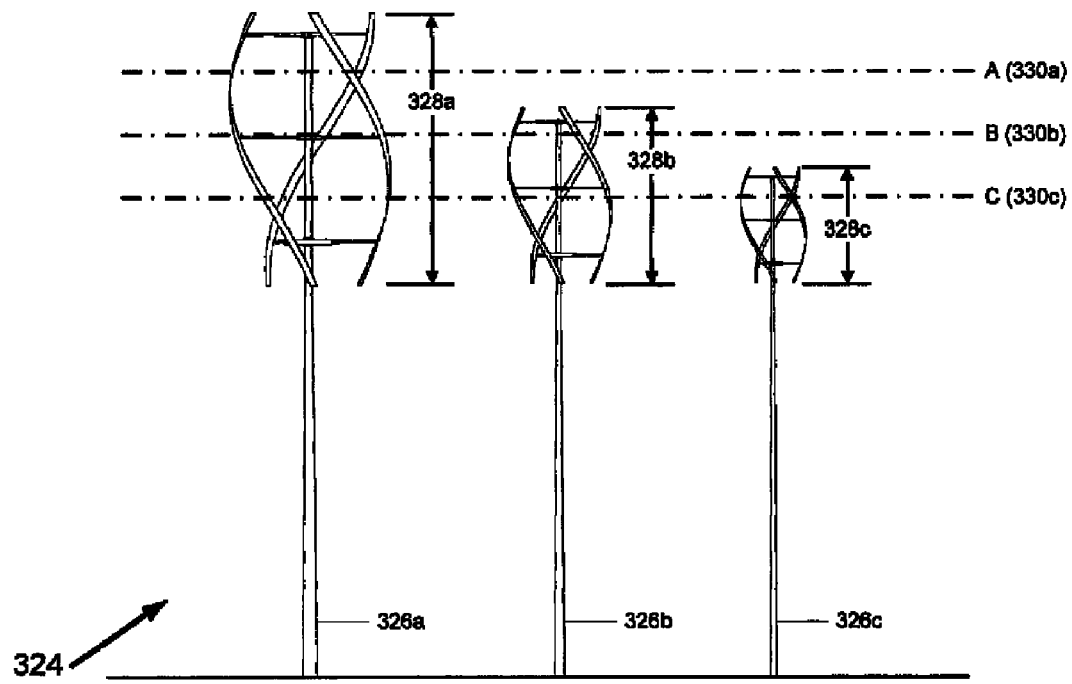

In FIG. 3C, a stratum configuration 324 includes a first wind turbine 326a, a second wind turbine 326b, and a third wind turbine 326c. The first wind turbine 326a is immediately adjacent to the second wind turbine 326b. The second wind turbine 326b is immediately adjacent to the first wind turbine 326a and the third wind turbine 326c.

The third wind turbine 326c is immediately adjacent to the second wind turbine 326b. The first wind turbine 326a has a first sweep height 328a which intersects a horizontal plane "A" 330a. The second wind turbine 326b has a second sweep height 328b which intersects a horizontal plane "B" 330b. The third wind turbine 326c has a third sweep height 328c which intersects a horizontal plane "C" 330c.

Between the first wind turbine 326a and the second wind turbine 326b (a wind turbine immediately adjacent to the first wind turbine 326a) both the first sweep height 328a and the second sweep height 328b intersect the horizontal plane "B" 330b and the horizontal plane "C" 330c. The first sweep height 328a intersects the horizontal plane "A" 320a. The second sweep height 328b, however, does not intersect the horizontal plane "A" 330a. Additionally, the horizontal plane "A" 330a is above horizontal planes intersected by both third sweep height 328c and the second sweep height 328b (e.g., the horizontal plane "B" 330b and the horizontal plane "C" 330c). As such, the horizontal plane "A" 330a is a horizontal plane which is both unique from and above horizontal planes intersected by the second sweep height 328b of the immediately adjacent second wind turbine 326b. Furthermore as FIG. 3C illustrates, the first sweep height 328a (and hence first wind turbine 326a) is sized to intersect the horizontal plane "A" 330a.

Similarly, the horizontal plane "B" 330b is a horizontal plane which is both unique from and above the horizontal planes intersected by the third sweep height 328c of the immediately adjacent third wind turbine 326c. Furthermore as FIG. 3C illustrates, the second sweep height 328b is sized to intersect the horizontal plane "B" 330b.

Unlike the previously described first and second sweep heights (328a and 328b), the third sweep height 328c does not intersect a horizontal plane which is both unique from and above the horizontal planes intersected by the second sweep height 328b of the immediately adjacent second wind turbine 326b. All horizontal planes intersected by the third sweep height 328c are also intersected by the second sweep height 328b. As such, as FIG. 3C illustrates, the third sweep height 328c (third wind turbine 326c) is not sized to intersect a horizontal plane which is both unique from and above the horizontal planes intersected by the second sweep height 328b of the immediately adjacent second wind turbine 326b.

In this way, in a stratum configuration, such as the stratum configuration 324 of FIG. 3C, sweep heights of substantially all wind turbines of the configuration are sized to intersect at least one horizontal plane unique from and above horizontal planes intersected by a sweep height of at least one immediately adjacent wind turbine.

In an alternative stratum configuration, sweep heights of substantially all wind turbines of the configuration are sized to intersect at least one horizontal plane unique from and below horizontal planes intersected by a sweep height of at least one immediately adjacent wind turbine.

Figure 3D:
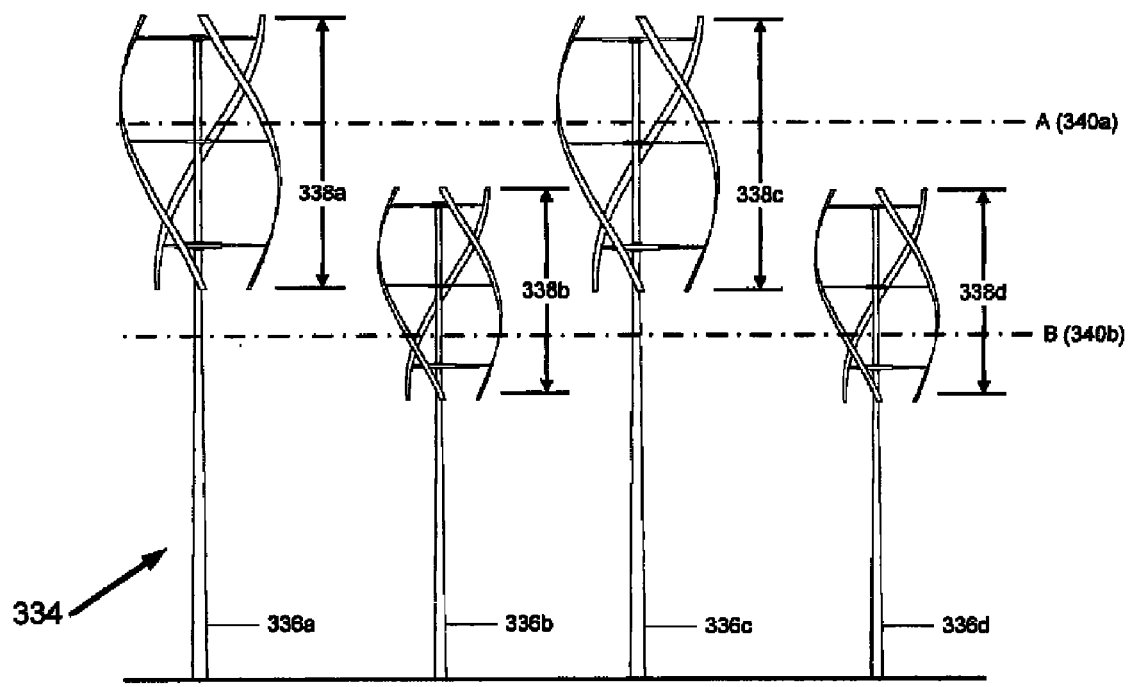

In FIG. 3D, a stratum configuration 334 includes a first wind turbine 336a, a second wind turbine 356b, a third wind turbine 336c, and a fourth wind turbine 336d. The first wind turbine 336a has a first sweep height 338a which intersects a horizontal plane "A" 340a. The second wind turbine 336b has a second sweep height 338b which intersects a horizontal plane "B" 340b.

The first sweep height 338a does not however intersect the horizontal plane "B" 340b. As such, the horizontal plane "B" 340b is unique from a horizontal plane intersected by a sweep height of an immediately adjacent wind turbine (viz., the first sweep height 338a of the first wind turbine 336a). Furthermore, the second sweep height 338b is sized to intersect the horizontal plane "B" 340b.

Similarly, the second sweep height 338b does not intersect the horizontal plane "A" 340a. As such, the horizontal plane "A" 340a is unique from a horizontal plane intersected by a sweep height of an immediately adjacent wind turbine (viz., the second sweep height 338b of the second wind turbine 336b). Furthermore, the first sweep height 338a is sized to intersect the horizontal plane "A" 340a.

In the stratum configuration 334, the third wind turbine 336c has a third sweep height 338c which is sized substantially the same as the first sweep height 338a. The fourth wind turbine 326d has a fourth sweep height 338d which is sized substantially the same as the second sweep height 338b. In other words, in the stratum configuration 334, a sweep height is sized either like the first sweep height 338a or the second sweep height 338b—a first "size" and a second "size". Consequently, in such a configuration, the stratum configuration 334 resembles a "picket fence" in appearance.

The stratum configuration 334 illustrated in FIG. 3D is merely illustrative and one skilled in the art will readily recognize that sweep heights may be sized according to additional "sizes" (e.g., a third size). In this way, in a stratum configuration, such as the stratum configuration 334 illustrated in FIG. 3D, sweep heights of at least two wind turbines of the configuration are sized to intersect at least one horizontal plane unique from horizontal planes intersected by a sweep height of at least one immediately adjacent wind turbine.

Figure 3E:
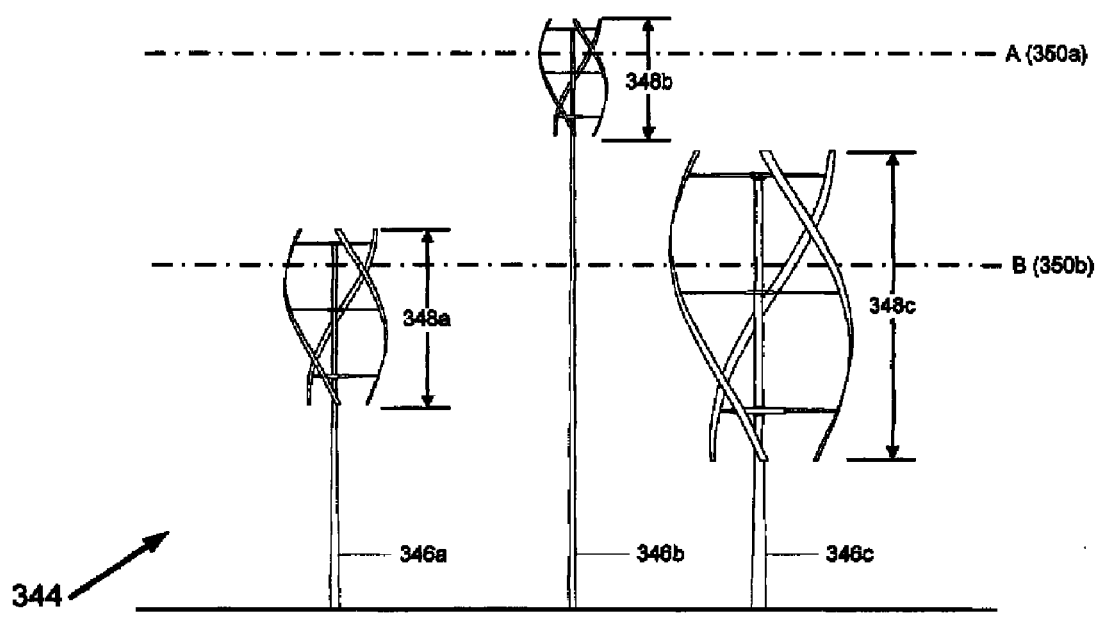

In FIG. 3E, a stratum configuration 344 includes a first wind turbine 346a, a second wind turbine 346b, and a third wind turbine 346c. The second wind turbine 346b is immediately adjacent to the first wind turbine 346a and the third wind turbine 346c. Presented differently, the second wind turbine 346b is an intermediate wind turbine between two terminal wind turbines, namely the first wind turbine 346a and the third wind turbine 346c.

The second wind turbine 346b has a second sweep height 348b which intersects a horizontal plane "A" 350a. The first wind turbine 346a has a first sweep height 348a, and the third wind turbine 346c has a third sweep height 348c. The first sweep height 348a and the third sweep height 348c intersect a horizontal plane "B" 350b. The first sweep height 348a and the third sweep height 348c do not however intersect the horizontal plane "A" 350a. As such, the horizontal plane "A" 350a is a horizontal plane unique from the horizontal planes, such as the horizontal plane "B" 350b, intersected by the first sweep height 348a and the third sweep height 348c. Furthermore, the horizontal plane "A" 350a is above the horizontal plane "B" 350b.

As FIG. 3E illustrates, the second sweep height 348b, the sweep height of an intermediate wind turbine, is sized to intersect the horizontal plane "A" 350a, a horizontal plane which is both unique and above horizontal planes intersected by the first and third sweep heights (348a and 348c), the sweep heights of two terminal wind turbines.

In this way, in a stratum configuration, such as the stratum configuration 344 illustrated in FIG. 3E, sweep heights of substantially all wind turbines between two wind turbines of the configuration are sized to intersect a horizontal plane above the horizontal planes intersected by the two wind turbines.

Figure 3F:
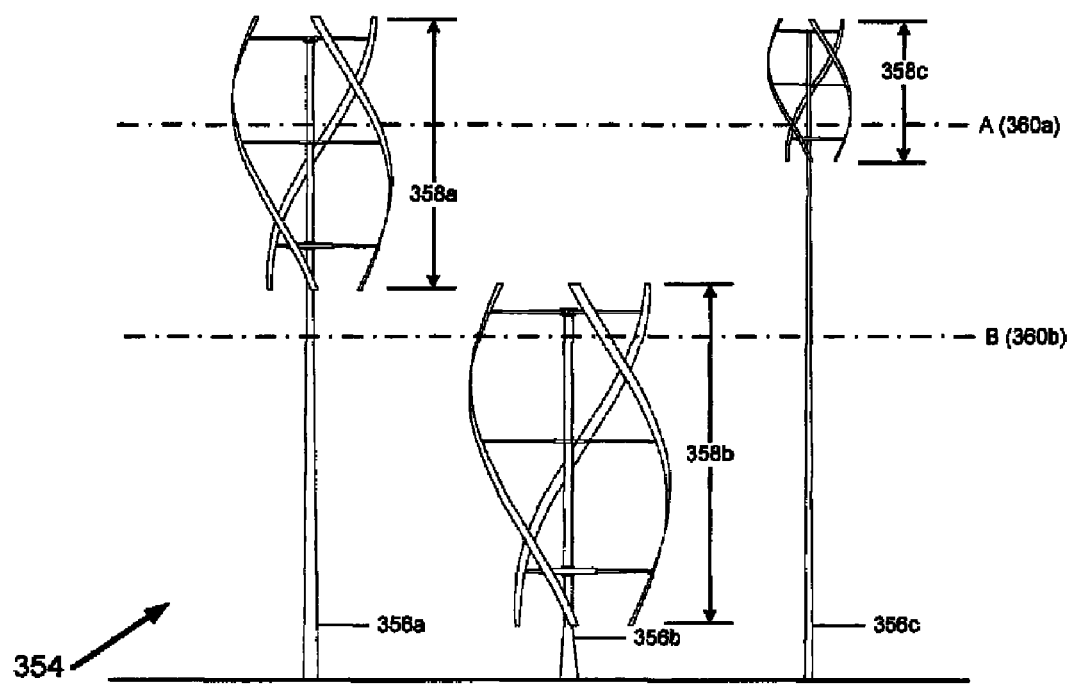

In FIG. 3F, a stratum configuration 354 includes a first wind turbine 356a, a second wind turbine 356b, and a third wind turbine 356c. The second wind turbine 356b is immediately adjacent to the first wind turbine 356a and the third wind turbine 356c. Presented differently, the second wind turbine 356b is in between two wind turbines, namely the first wind turbine 356a and third wind turbine 356c.

The second wind turbine 356b has a second sweep height 358b which intersects a horizontal plane "B" 360b. The first wind turbine 356a has a first sweep height 358a, and the third wind turbine 356c has a third sweep height 358c. The first sweep height 358a and the third sweep height 358c intersect a horizontal plane "A" 360a. The first sweep height 358a and the third sweep height 358c do not however intersect the horizontal plane "B" 360b. As such, the horizontal plane "B" 360b is a horizontal plane unique from the horizontal planes, such as the horizontal plane "A" 360a, intersected by the first sweep height 358a and the third sweep height 358c. Furthermore, the horizontal plane "B" 360b is below the horizontal plane "A" 360a.

As FIG. 3F illustrates, the second sweep height 358b (second wind turbine 356b) is sized to intersect the horizontal plane "B" 360b, a horizontal plane which is both unique from horizontal planes intersected by the sweep heights of the first and third sweep heights (358a and 358c) and below such horizontal planes. In this way, in a stratum configuration, such as the stratum configuration 354 illustrated in FIG. 3F, sweep heights of substantially all wind turbines between two wind turbines of the stratum configuration are sized to intersect a horizontal plane below the horizontal planes intersected by the two wind turbines.

The above description in reference to FIGS. 3E and 3F is not intended to limit embodiments of the present invention to a single intermediate wind turbine between or otherwise bordered by two terminal wind turbines. Rather, the principles of the present invention are readily applicable to any number of intermediate wind turbines between the two terminal wind turbines. As before, in such instances, sweep heights of substantially all wind turbines between two wind turbines of the stratum configuration are sized to intersect a horizontal plane above (or below) horizontal planes intersected by the two wind turbines.

In reference to FIGS. 3A-3F, a stratum configuration is described as a configuration of a plurality of wind turbines whose sweep heights are sized to intersect one or more horizontal planes unique from horizontal planes intersected by a sweep height of a least one immediately adjacent wind turbine. That is, in the example embodiments described in reference to FIGS. 3A-3F, the sizing of a sweep height depends on a horizontal plane and how the subject horizontal plane relates to other horizontal planes. Alternatively, a sweep height of a wind turbine may be sized so that the sweep height differs from another sweep height of another wind turbine. That is, rather than depending on a horizontal plane, the sizing of a sweep height for a given wind turbine depends on a sweep height of one or more immediately adjacent wind turbines.

Figure 4A:
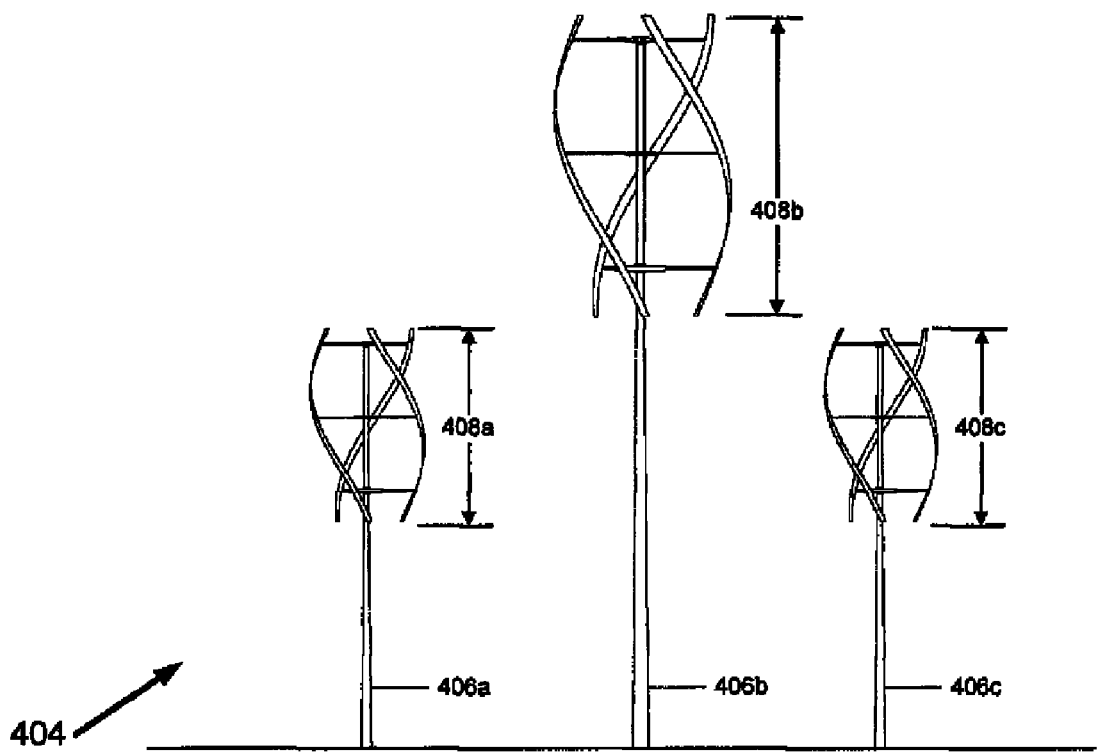
FIGS. 4A-C are diagrams of example stratum configurations with sweep heights sized with respect to a sweep height of an immediately adjacent wind turbine, in accordance with embodiments of the present invention.

In FIG. 4A, a stratum configuration 404 includes a first wind turbine 406a, a second wind turbine 406b, and a third wind turbine 406c. In the stratum configuration 404, the first wind turbine 406a is immediately adjacent to the second wind turbine 406b, the second wind turbine 406b is immediately adjacent to the first wind turbine 406a and the third wind turbine 406c, and the third wind turbine 406c is immediately adjacent to the second wind turbine 406b. The first wind turbine 406a is not immediately adjacent to the third wind turbine 406c.

The first wind turbine 406a has a first sweep height 408a, the second wind turbine 406b has a second sweep height 408b, and the third wind turbine 406c has a third sweep height 408c. The first sweep height 408a differs from (i.e., is not equal to) the second sweep height 408b. In this example, the first sweep height 408a is less than the second sweep height 408b. The second sweep height 408b differs from both the first sweep height 408a and the third sweep height 408c. In this example, the second sweep height 408b is greater than both the first sweep height 408a and the third sweep height 408c. The first sweep height 408a is substantially the same or otherwise equal to the third sweep height 408c. However, the first wind turbine 406a is not immediately adjacent to the third wind turbine 406c. In this way, in a stratum configuration, such as the stratum configuration 404 of FIG. 4A, sweep heights of substantially all wind turbines of the configuration are sized to differ from a sweep height of an immediately adjacent wind turbine.

Figure 4B:
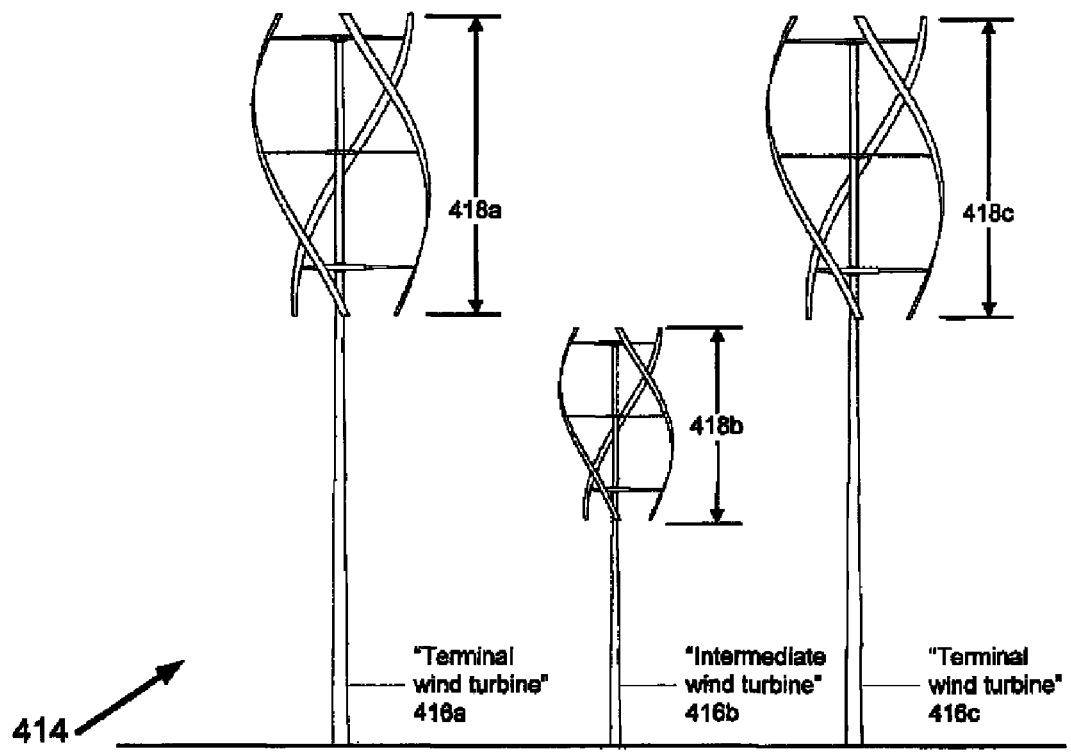

In FIG. 4B, a stratum configuration 414 includes a first wind turbine 416a, a second wind turbine 416b, and a third wind turbine 416c. In the stratum configuration 414, the first wind turbine 416a is immediately adjacent to the second wind turbine 416b, the second wind turbine 416b is immediately adjacent to the first wind turbine 416a and the third wind turbine 416c, and the third wind turbine 416c is immediately adjacent to the second wind turbine 416b. The first wind turbine 416a is not immediately adjacent to the third wind turbine 416c. The first wind turbine 416a has a first sweep height 418a, the second wind turbine 416b has a second sweep height 418b, and the third wind turbine 416c has a third sweep height 418c.

In the stratum configuration 414, the first wind turbine 416a and the third wind turbine 416c are "terminal" wind turbines. That is to say, the first wind turbine 416a and the third wind turbine 416c are positioned at the "ends" of the stratum configuration 414. In the example illustrated in FIG. 4B, the sweep heights (418a and 418c) of the terminal wind turbines are substantially equal to one another. Alternatively, sweep heights of terminal wind turbines may differ from one another (e.g., one is greater than the other).

Continuing with FIG. 4B, the second wind turbine 416b is an "intermediate" wind turbine, i.e., the second wind turbine 416b is located in between or in the "middle" of the ends of the stratum configuration 414. In the example illustrated in FIG. 4B, the second sweep height (418b) of the intermediate wind turbine is less than the first and third sweep heights (418a and 418c) of the terminal wind turbines. Alternatively, a sweep height of an intermediate wind turbine may be greater than sweep heights of terminal wind turbines.

While FIG. 4B illustrates a single intermediate wind turbine, the principles of the present invention are also applicable to instances where there are more than one intermediate wind turbine between terminal wind turbines. In this way, in a stratum configuration, such as the stratum configuration 414 of FIG. 4B, sweep heights of substantially all wind turbines between a first wind turbine and at least one second wind turbine are sized to differ from a first sweep height of the first wind turbine and a second sweep height of the second wind turbine.

Figure 4C:
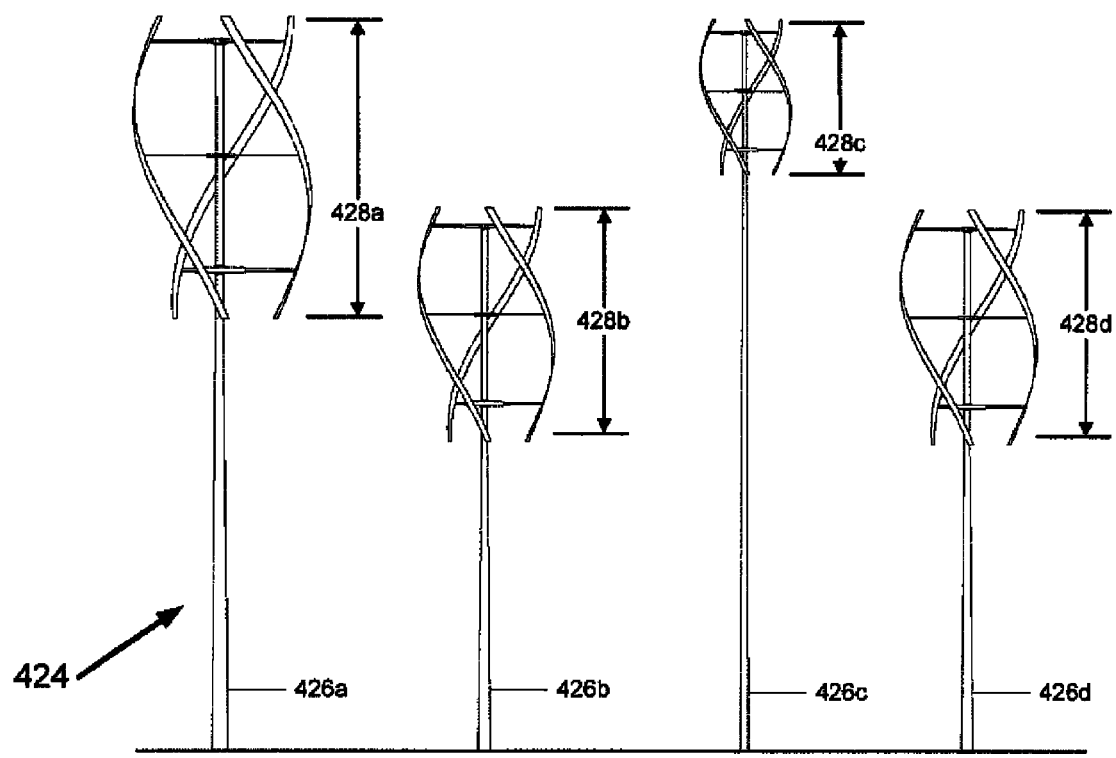

In FIG. 4C, a stratum configuration 424 includes a first wind turbine 426a, a second wind turbine 426b, a third wind turbine 426c, and a fourth wind turbine 426d. The first wind turbine 426a has a first sweep height 428a, the second wind turbine 426b has a second sweep height 428b, the third wind turbine 426c has a third sweep height 4298, and the fourth wind turbine 426d has a fourth sweep height 428d. The sweep heights of the second wind turbine 426b and the fourth wind turbine 426d (viz., 428b and 428d) are substantially the same or otherwise equal. As such, the second wind turbine 426b and the fourth wind turbine 426d are a pair of wind turbines having substantially equal sweep heights.

In the stratum configuration 424, the third wind turbine 426c is between the pair of wind turbines 426b and 426d. The third sweep height 428c of the third wind turbine 426c differs from (i.e., is not equal to) the second sweep height 428b and the fourth sweep height 428d. In this way, in a stratum configuration, such as the stratum configuration 424, sweep heights of substantially all wind turbines between any pair of wind turbines having substantially the same sweep heights are sized to differ from the sweep heights of the pair of wind turbines.

So far, in one embodiment described in reference to FIGS. 2 and 3A-3F, sweep heights are sized with respect to horizontal planes intersected by a sweep height of an immediately adjacent wind turbine. In an alternative embodiment described in reference to FIGS. 4A-4C, sweep heights are sized with respect to a sweep height of an immediately adjacent wind turbine. Now, in yet another embodiment, sweep heights are sized with respect to a horizontal spacing between a first wind turbine and a second wind turbine.

Figure 5:
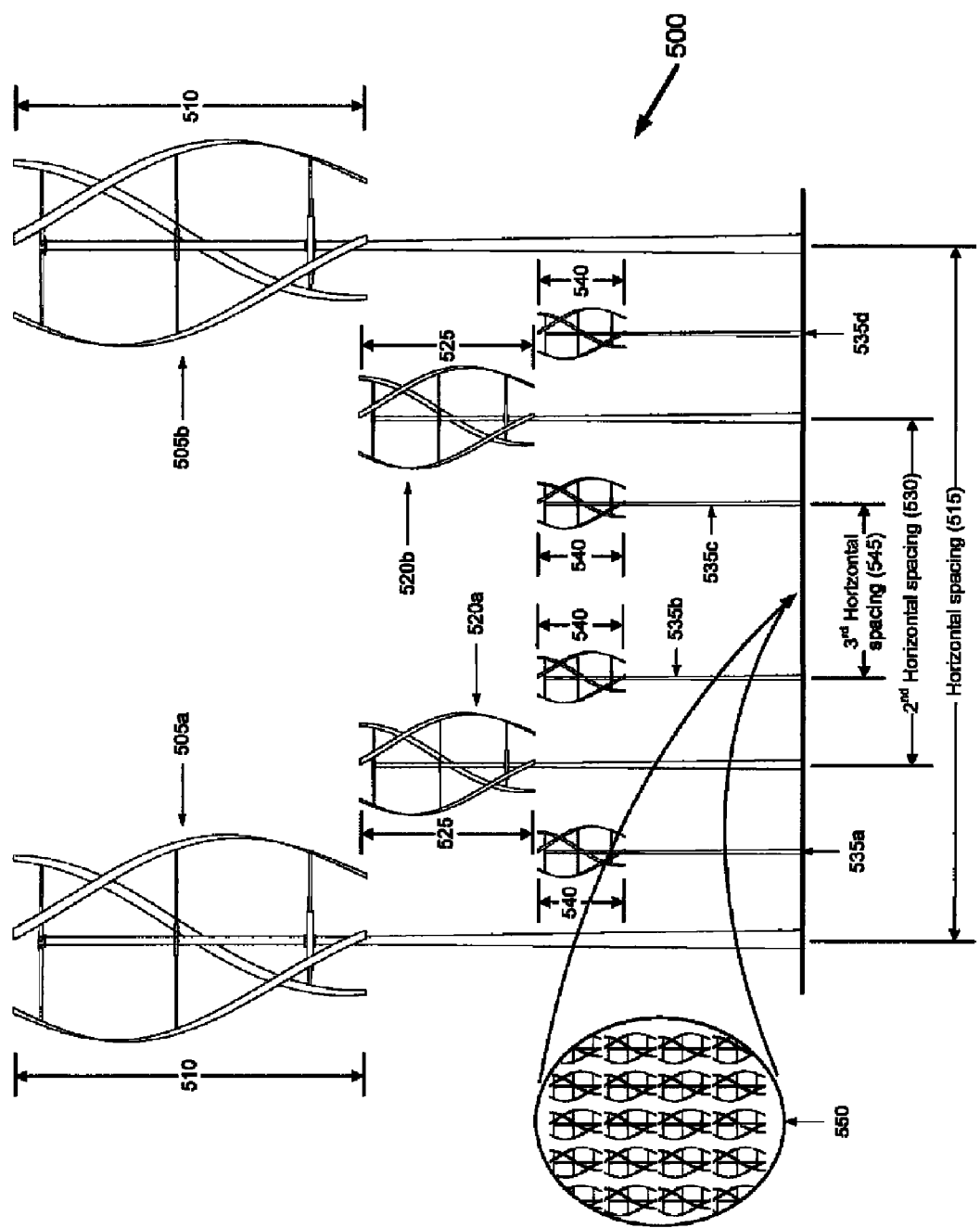
FIG. 5 is a diagram of a stratum configuration with sweep heights of a first wind turbine and at least one second wind turbine sized according to a horizontal spacing between the first wind turbine and the second wind turbine, in accordance with an embodiment of the present invention.

In FIG. 5, in a stratum configuration 500, a first wind turbine 505a and a second wind turbine 505b, each with substantially similar sweep height 510, are located a distance from one another, hereinafter referred to as a horizontal spacing 515. The horizontal spacing 515 may be defined as a multiple of the sweep height 510. To illustrate, horizontal spacing 515 is equal to two and half times the sweep height 510. Accordingly, with a sweep height of 50 feet, the first and second wind turbines (505a 505b) are spaced 125 feet apart from one another.

A particular or "recommended" horizontal spacing between wind turbines may account or otherwise be influence by aerodynamic considerations or constraints. For example, improper spacing between wind turbines of similar sweep heights may result in turbulence, interfering with wind energy gathering capabilities, and thus efficiency of such wind turbines.

Continuing with FIG. 5, within the horizontal spacing 515, a second set of wind turbines 520a and 520b, each with a substantially similar sweep height 525, are located. The second set of wind turbines 520a and 520b are located a second horizontal spacing 530 from each other. As FIG. 5 illustrates, the second horizontal spacing 530 is a smaller division of the horizontal spacing 515. As such, the sweep heights 525 are sized less than the sweep height 510.

Similarly, within the second horizontal spacing 530, a third set of wind turbines 535a-d, each with a substantially similar sweep height 540, are located. The third set of wind turbines 535a-d is located a third horizontal spacing 545 from each other. The third horizontal spacing 545 is a smaller division of the second horizontal spacing 530 and an even smaller division of the horizontal spacing 515. As such, the sweep height 540 is sized smaller than the sweep height 525 and sized even smaller than the sweep height 510.

It should be readily apparent that a horizontal spacing may be divided or otherwise reduced into ever smaller divisions or horizontal spacings. That is to say, a horizontal spacing is infinitely divisible. Equally apparent, with each smaller division of the horizontal spacing, a respective sweep height is sized even smaller. For example, the stratum configuration 500 includes a sheet of micro-sized wind turbines 550. One skilled in the art will readily recognize that even smaller sized wind turbines, such as nano-sized wind turbines, are also applicable.

In this way, in a stratum configuration, such as the stratum configuration 500 of FIG. 5, sweep heights of a first wind turbine and at least one second wind turbine are sized according to a horizontal spacing between the first wind turbine and the second wind turbine.

Figure 6A:
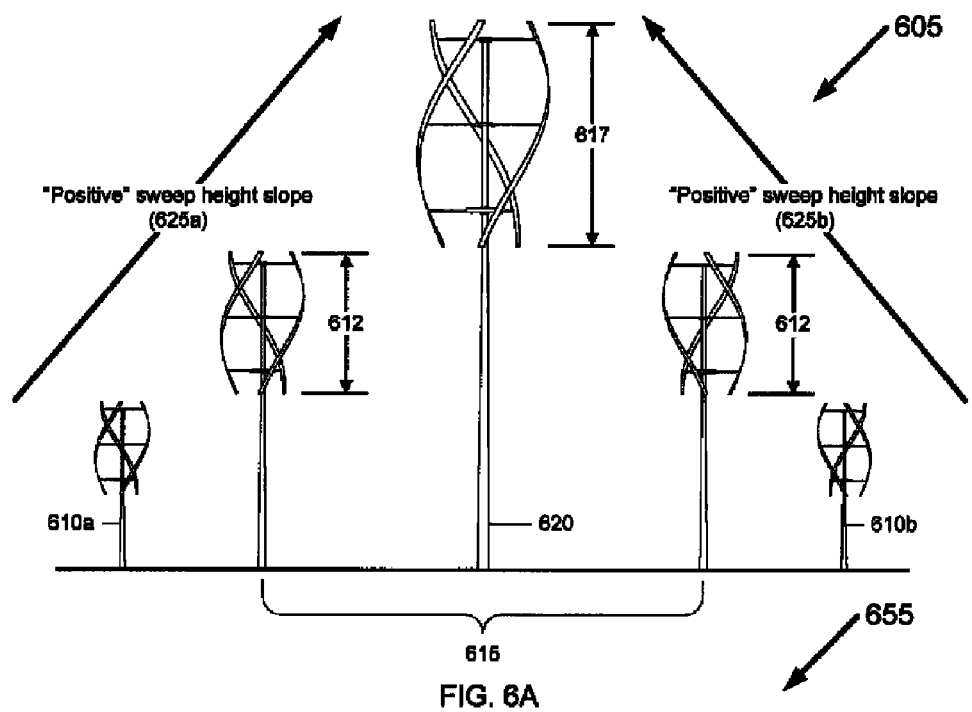
FIGS. 6A-B are diagrams of stratum configurations with accretive gain and loss, in accordance with embodiments of the present invention.

In FIG. 6A, in a stratum configuration 605, starting from a first terminal wind turbine 610a and a second terminal wind turbine 610b, sweep heights 612 of each successive intermediate wind turbine 615 are sized greater than a sweep height of a previous wind turbine until a maximum sweep height 617 is reached or is otherwise attained. In the stratum configuration 605, the maximum sweep height 617 height belongs to a maximum intermediate wind turbine 620.

An overall increase in sweep height size from a first wind turbine to at least one second wind turbine may be said to describe a stratum configuration with a positive sweep height slope. Similarly, an overall decrease in sweep height size from a first wind turbine to at least one second wind turbine may be said to describe a stratum configuration with a negative sweep height slope.

Returning to FIG. 6A, in the stratum configuration 605, sweep heights 612 of intermediate wind turbines 615 are successively increasing from both the first terminal wind turbine 610a and the second terminal wind turbine 610b to the maximum intermediate wind turbine 620. The stratum configuration 605 resembles a "pyramid" in appearance. As such, the stratum configuration 605 may be characterized as having a first positive sweep height slope 625a and a second positive sweep height slope 625b. Presented differently, the stratum configuration 605 may be said to be a stratum configuration with an "accretive gain."

Figure 6B:
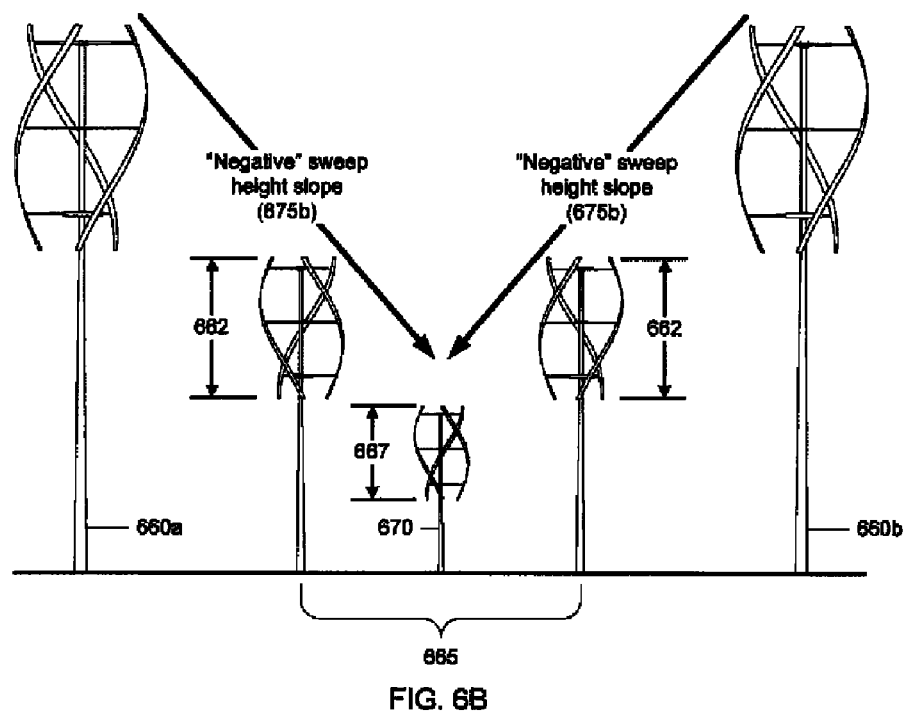

In FIG. 6B, in a stratum configuration 655, starting from a first terminal wind turbine 660a and a second terminal wind turbine 660b, sweep heights 662 of each successive intermediate wind turbine 665 are sized less than a sweep height of a previous wind turbine until a minimum sweep height 667 is reached or is otherwise attained. In the stratum configuration 655, the minimum sweep height 667 belongs to a minimum intermediate wind turbine 670.

In the stratum configuration 655, sweep heights are successively decreasing from both the first terminal wind turbine 660a and the second terminal wind turbine 660b to the minimum intermediate wind turbine 670. The stratum configuration 655 resembles a "suspension bridge" in appearance. As such, the stratum configuration 655 may be characterized as having a first negative sweep height slope 675a and a second negative sweep height slope 675b. Presented differently, the stratum configuration 655 may be said to be a stratum configuration with an "accretive loss."

The stratum configurations 605 and 655 illustrated in FIGS. 6A and 6B are merely illustrative of the above-mentioned principles. For example, one skilled in the art will readily recognize that the "patterns" underlying the stratum configurations 605 and 655 may be repeated indefinitely in a stratum configuration.

In the above description, example stratum configurations are illustrated as having a plurality of wind turbines arranged in a single line (e.g., arranged side to side when viewed from the front of a stratum configuration). Such examples are merely illustrative and are not intended to limit the principles of the present invention. One skilled in the art will readily recognize that in a stratum configuration embodying the aforementioned principles, a plurality of wind turbines may be arranged or otherwise implemented along one or more lines or axes. Consider the following example.

FIG. 7 is a top down view of an example stratum configuration 705 having a First implementation axis 710a and a second implementation axis 710b. The first implementation axis 710a and second implementation axis 710b are substantially perpendicular to each other.

Running parallel to the first implementation axis 710a, a first wind turbine 715a, second wind turbine 715b, third wind turbine 715c, and a fourth wind turbine 715d (generally 715) are arranged or otherwise located in a first "row" 720a and a second "row" 720b (generally 720). Additionally, running parallel to the second implementation axis 710b, the wind turbines 715 are arranged in a first "column" 725a and a second "column" 725b (generally 725).

The terms "row" and "column" are merely used as a convenient way of differentiating an arrangement of wind turbines aligned with one implementation axis from an another arrangement of wind turbines aligned with another implementation axis. As such, the terms are not intended to be limiting or suggest a preferred orientation.

In the stratum configuration 705, for each wind turbine 7115 in the rows 720 and columns 725, a sweep height is sized according to example embodiments previously described. To illustrate, consider the following example illustrated in FIG. 7B.

Figure 7A:
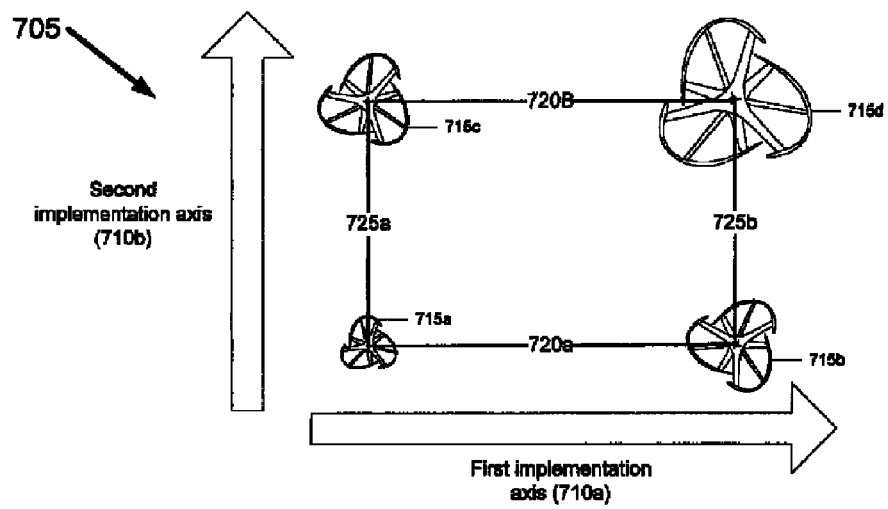
FIGS. 7A-B are diagrams of a stratum configuration having two axes of implementation, in accordance with an embodiment of the present invention.
Figure 7B:
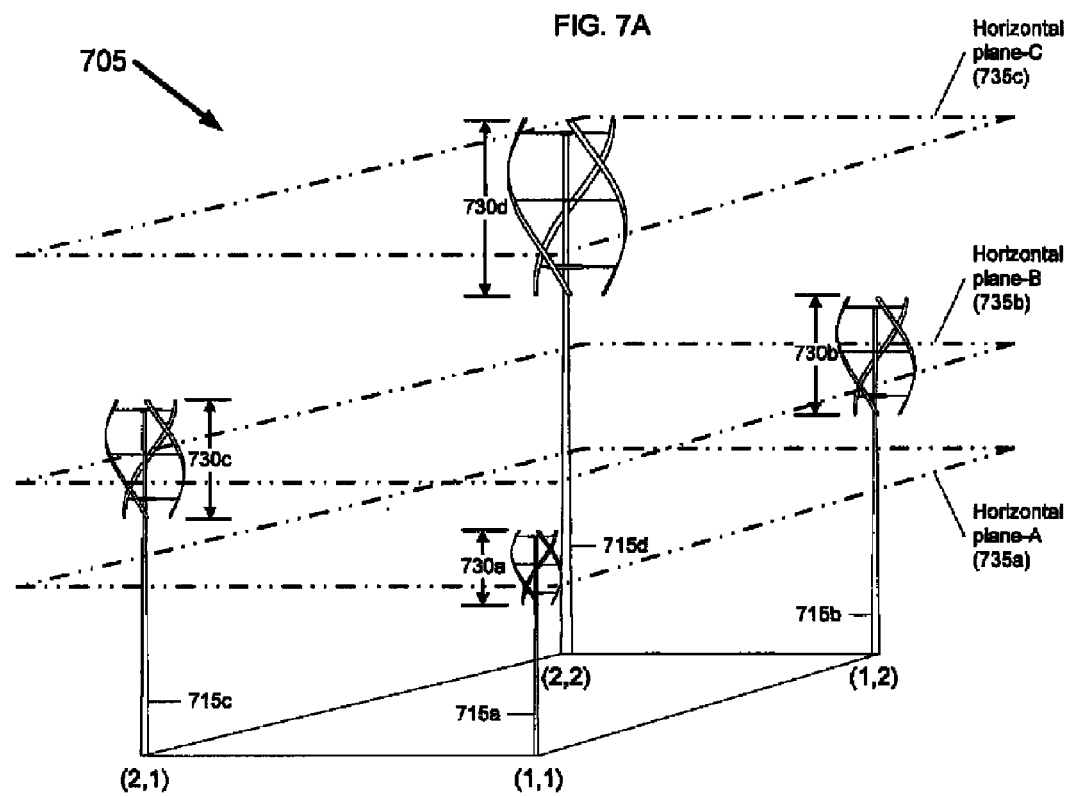

FIG. 7B illustrates the stratum configuration 705 of FIG. 7A, but in a perspective view. For the sake of readability, the location of each wind turbine is described as an ordered pair, i.e., (row number, column number). The first wind turbine 715a, located at (1, 1), has a first sweep height 730a. The second wind turbine 715b, located at (1, 2), has a second sweep height 730b. The third wind turbine 715c, located at (2, 1), has a third sweep height 730c. The fourth wind turbine 715d, located at (2, 2) has a fourth sweep height 730d. In the stratum configuration 705, the wind turbines 715 are immediately adjacent to each other.

A horizontal plane "A" 735a is intersected by the first sweep height 730a, but not by the second, third or fourth sweep heights (730b-d). As such, the first sweep height 730a is sized to intersect a horizontal plane unique from horizontal planes intersected by a sweep height of at least one immediately adjacent wind turbine, e.g., the second sweep height 730b, the third sweep height 730c or the fourth sweep height 730d.

Similarly, a horizontal plane "C" 735c is intersected by the fourth sweep height 730d, but not by the first, second or third sweep heights (730a-c). As such, the fourth sweep height 730d is sized to intersect a horizontal plane unique from horizontal planes intersected by a sweep height of at least one immediately adjacent wind turbines, e.g., the first sweep height 730a, the second sweep height 730b or the third sweep height 730c.

A horizontal plane "B" 735b is intersected by both the second sweep height 730b and the third sweep height 730c. However, because the second wind turbine 715b is immediately adjacent to the first wind turbine 715a and the first sweep height 730a does not intersect the horizontal plane "B" 735b, the second sweep height 730b is sized to intersect a horizontal plane unique from horizontal planes intersected by a sweep height of at least one immediately adjacent wind turbine. Similarly, because the third wind turbine 715c is immediately adjacent to the fourth wind turbine 715d and the fourth sweep height 730d does not intersect the horizontal plane "B" 735b, the third sweep height 730c is sized to intersect a horizontal plane unique from horizontal planes intersected by a sweep height of at least one immediately adjacent wind turbine.

In this way, in a stratum configuration having more than one implementation axis, such as the stratum configuration 705 of FIGS. 7A and 7B, sweep heights of substantially all wind turbines in the configuration are sized to intersect at least one horizontal plane unique from horizontal planes intersected by at least one immediately adjacent wind turbine.

Figure 8A:
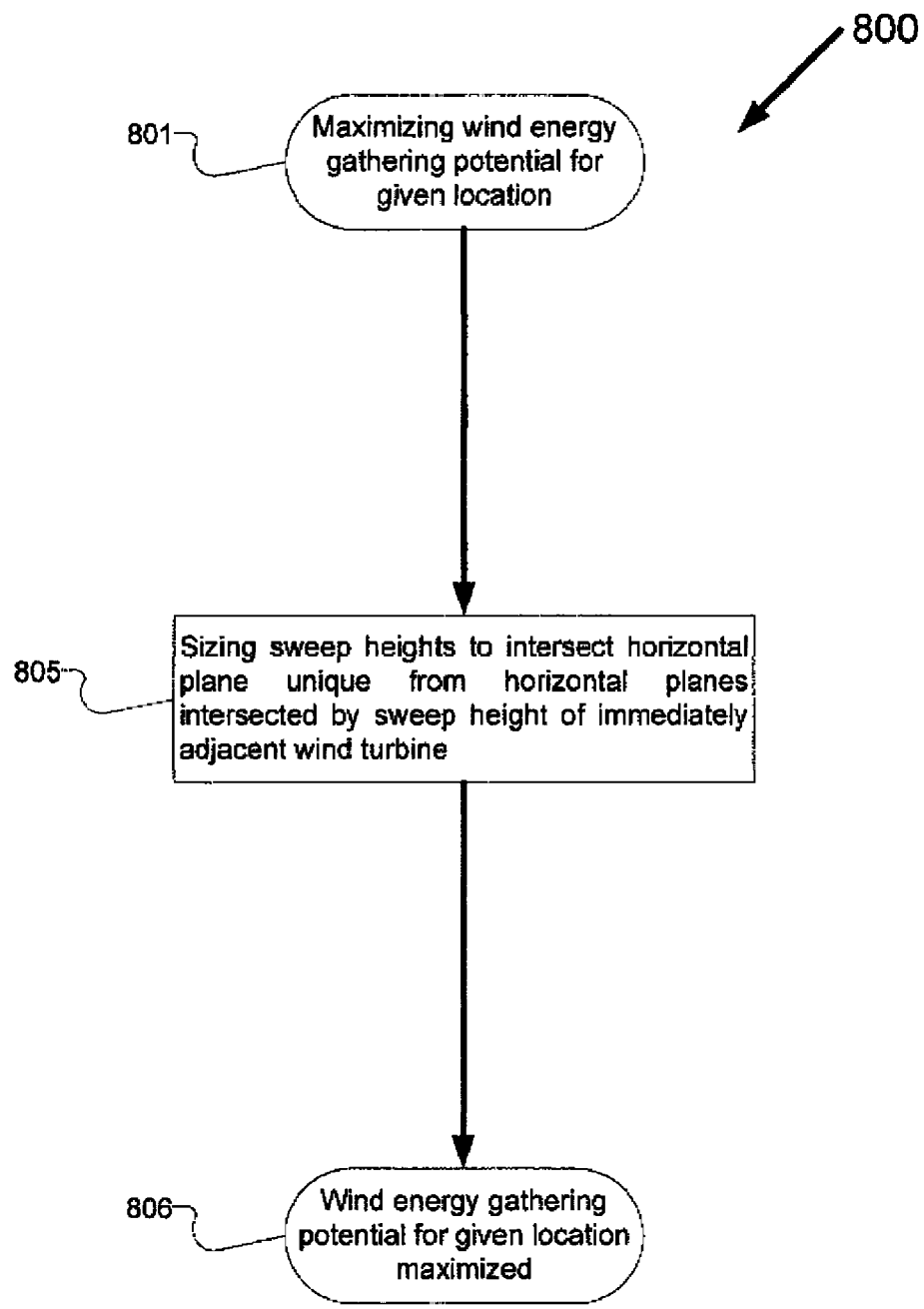
FIGS. 8A-B are flow diagrams of example processes for implementing a stratum configuration, in accordance with embodiments of the present invention.

In FIG. 8A, an example process 800 starts (801) maximizing wind energy gathering potential of a plurality of wind turbines for a given location. The process 800 sizes (805) sweep heights of substantially all wind turbines of the plurality to intersect horizontal planes unique from horizontal planes intersected by a sweep height of an immediately adjacent wind turbine. The process 800 ends (806) with the wind energy gathering potential of the plurality of wind turbines maximized for the given location.

In FIG. 5B, an example process 850 starts (851) sizing sweep heights of wind turbines between a first wind turbine and second wind turbine. The process 850 determines (855) whether a sweep height of a wind turbine intersects a horizontal plane unique from horizontal planes intersected by an immediately adjacent wind turbine. If the process 850 determines (855) the sweep height does not intersect a horizontal plane unique from horizontal planes intersected by an immediately adjacent wind turbine, the process 850 sizes (860) the sweep height to intersect a horizontal plane which is unique from horizontal planes intersected by the immediately adjacent wind turbine.

The process 850 determines (865) whether the sweep height intersects a horizontal plane below horizontal planes intersected by the first and second wind turbines. If the process 850 determines (865) the sweep height does not intersect a horizontal plane below the horizontal planes intersected by the first and second wind turbines, the process 850 sizes (870) the sweep height to intersect a horizontal plane below the horizontal planes intersected by the first and second wind turbines.

The process 850 determines (875) whether there are more wind turbines between the first and second wind turbines. If the process 850 determines (875) there are more wind turbines between the first wind turbine and second wind turbine, the process 800 continues (loops back) to determine (855) whether a sweep height of another wind turbine intersects a horizontal plane unique from horizontal planes intersected by an immediately adjacent wind turbine. If, however, the process 850 determines (875) there are no more wind turbines between the first and second wind turbines, the process 850 ends (876) with the sweep heights of the wind turbines between the first and second wind turbines sized.

Returning to the process 850 determining (855), in an event the process 850 determines (855) that the sweep height does intersect a horizontal plane unique from horizontal planes intersected by an immediately adjacent wind turbine, the process 850 then determines (865) whether the sweep height intersects a horizontal plane below horizontal planes intersected by the first and second wind turbines.

Returning to the process 850 determining (865), in an event the process 850 determines (865) that the sweep height does intersect a horizontal plane below horizontal planes intersected by the first and second wind turbines, the process 850 then determines (875) whether there are more wind turbines between the first and second wind turbines.

While this invention has been particularly shown and described with references to example embodiments thereof, it will be understood by those skilled in the art that various changes in form and details may be made therein without departing from the scope of the invention encompassed by the appended claims.

For example, while example embodiments of the present invention are described in reference to one "type" of wind turbine, one skilled in the art will readily recognize that the principles of the present invention are also applicable to other types of wind turbines.

A wind turbine (or "wind turbine generator") is a device that includes a turbine and a generator, wherein the turbine gathers or captures wind by conversion of some of the wind energy into rotational energy of the turbine, and the generator generates electrical energy from the rotational energy of the turbine. These wind turbine generators can employ a turbine rotating around an axis oriented in any direction.

For example, in a "horizontal axis turbine," the turbine rotates around a horizontal axis, which is oriented, typically, more or less parallel to the ground (or other form of underlying support). Furthermore, in a "vertical axis turbine," the turbine rotates around a vertical axis, which is oriented, typically, more or less perpendicular to the ground (or other form of underlying support).

For example, a vertical axis turbine can be a Darrieus wind turbine, a Giromill-type Darrieus wind turbine, a Savonius wind turbine, a "helix-style turbine" and the like. In a "helix-style turbine," the turbine is helically shaped and rotates around a vertical axis. A helix-style turbine can have a single-helix design or multi-helix design, for example, double-helix, triple-helix or quad-helix design.

A "roadway" or "road," as used in this application refers to any identifiable route or path between two or more places on which vehicles can drive or otherwise use to move from one place to another. A roadway is typically smoothed, paved, or otherwise prepared to allow easy travel by the vehicles. Also, typically, a roadway may include one or more lanes, one or more breakdown lanes, one or more medians or center dividers, and one or more guardrails. For example, a roadway may be: a highway; turnpike; pike; toll road; state highway; freeway; clearway; expressway; parkway; causeway; throughway; interstate; speedway; autobahn; superhighway; street; track for railroad, monorail, magnetic levitation trains; track for subterranean, ground level, and elevated forms of public transmit or mass transmit; car race track; airplane runway; and the like.

Figure 8B:
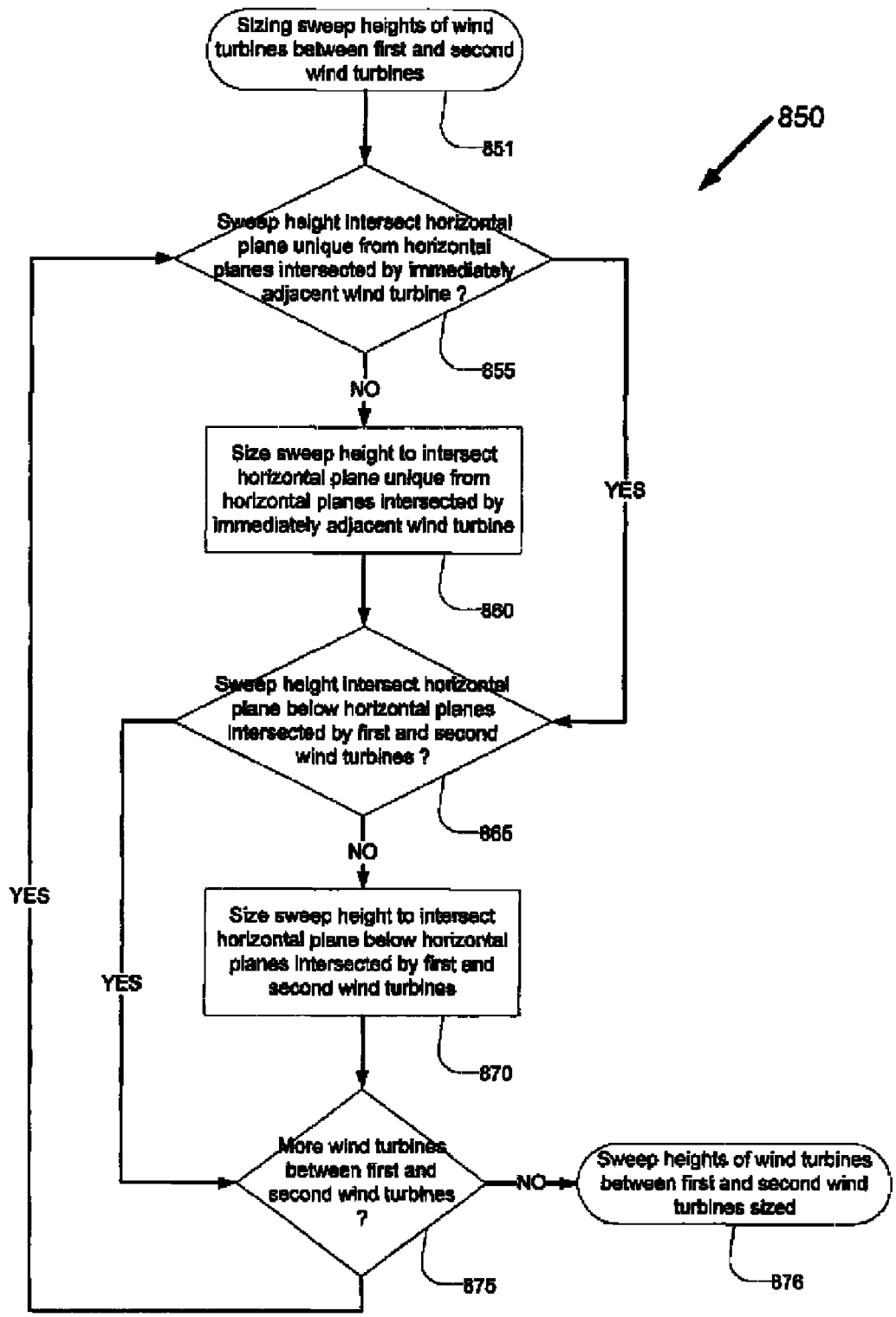

It should be understood that the flow diagrams (FIGS. 8A-B) may include more or fewer elements, be arranged differently, or be represented differently. It should be understood that implementation may dictate the flow diagrams and the number of flow diagrams illustrating the execution of embodiments of the invention. Processes 800 and 850 of FIGS. 8A-B may be computer implemented.

What is claimed is:

1. A method for harnessing wind energy with a plurality of wind turbines, each wind turbine having a sweep height, the method comprising:

providing an apparatus having a configuration of the wind turbines, including in the apparatus:

sizing sweep heights of a first wind turbine and at least one second wind turbine with substantially same sweep heights according to a horizontal spacing between the first wind turbine and the at least one second wind turbine;

reducing the horizontal spacing; and repeating the sizing and reducing at least until each wind turbine of the plurality of wind turbines is sized;

wherein the sizing step further comprises sizing sweep height of substantially each wind turbine of the plurality of wind turbines to intersect at least one horizontal plane unique from horizontal planes intersected by a sweep height of at least one immediately adjacent wind turbine.

2. The method of claim 1 wherein sizing includes sizing the sweep heights to intersect at least two horizontal planes unique from horizontal planes intersected by a sweep height of at least one immediately adjacent wind turbine.

3. The method of claim 1 wherein sizing includes sizing the sweep heights to intersect horizontal planes unique from horizontal planes intersected by a sweep height of at least one immediately adjacent wind turbine.

4. The method of claim 1 wherein sizing includes sizing the sweep heights to intersect at least one horizontal plane above horizontal planes intersected by a sweep height of at least one immediately adjacent wind turbine.

5. The method of claim 1 wherein sizing includes sizing sweep heights of substantially all wind turbines between a first wind turbine and a second wind turbine to intersect horizontal planes above horizontal planes intersected by the first wind turbine and the second wind turbine.

6. The method of claim 1 wherein sizing includes sizing sweep heights of substantially all wind turbines between a first wind turbine and a second wind turbine to intersect horizontal planes below horizontal planes intersected by the first wind turbine and the second wind turbine.

7. The method of claim 1 wherein sizing includes sizing sweep heights of at least two wind turbines of the plurality of wind turbines to intersect at least one horizontal plane unique from horizontal planes intersected by a sweep height of at least one immediately adjacent wind turbine.

8. The method of claim 1 wherein sizing the sweep heights of substantially each of the plurality of wind turbines to differ from a sweep height of an immediately adjacent wind turbine.

9. The method of claim 8 wherein sizing includes sizing a first sweep height of a first wind turbine to be greater than a second sweep height of at least one second wind turbine.

10. The method of claim 8 wherein sizing includes sizing the sweep heights of substantially all wind turbines between a first wind turbine and at least one second wind turbine to differ from the first sweep height and the second sweep height.

11. The method of claim 10 wherein sizing includes sizing the sweep heights of substantially all wind turbines between the first wind turbine and the at least one second wind turbine to be greater than the first sweep height and the second sweep height.

12. An apparatus to harness wind energy with a plurality of wind turbines, each wind turbine having a sweep height, the apparatus comprising:

a configuration of the wind turbines, sweep heights of a first wind turbine and at least one second wind turbine with substantially same sweep heights of the configuration are sized according to a horizontal spacing between the first wind turbine and the at least one second wind turbine, the horizontal spacing repeatedly reduced and sweep heights repeatedly sized at least until each wind turbine of the configuration is sized;

wherein sweep heights of substantially all wind turbines of the configuration are each sized to intersect at least one horizontal plane unique from horizontal planes intersected by a sweep height of at least one immediately adjacent wind turbine.

13. The apparatus of claim 12 wherein the sweep heights of substantially all wind turbines of the configuration are each sized to intersect at least two horizontal planes unique from horizontal planes intersected by a sweep height of at least one immediately adjacent wind turbine.

14. The apparatus of claim 12 wherein the sweep heights of substantially all wind turbines of the configuration are each sized to intersect horizontal planes unique from horizontal planes intersected by a sweep height of at least one immediately adjacent wind turbine.

15. The apparatus of claim 12 wherein the sweep heights of substantially all wind turbines of the configuration are each sized to intersect at least one horizontal plane above horizontal planes intersected by the sweep heights of at least one immediately adjacent wind turbine.

16. The apparatus of claim 12 wherein the sweep heights of substantially all wind turbines between a first wind turbine and a second wind turbine of the configuration are each sized to intersect horizontal planes above the horizontal planes intersected by the first wind turbine and the second wind turbine.

17. The apparatus of claim 12 wherein the sweep heights of substantially all wind turbines between two wind turbines of the configuration are each sized to intersect horizontal planes below the horizontal planes intersected by the two wind turbines.

18. The apparatus of claim 12 wherein the configuration of the wind turbines, sweep heights of substantially all wind turbines of the configuration are sized to differ from a sweep height of an immediately adjacent wind turbine.

19. The apparatus of claim 18 wherein the configuration includes a first wind turbine with a first sweep height greater than a second sweep height of at least one second wind turbine.

20. The apparatus of claim 18 wherein the configuration includes a first wind turbine with a first sweep height and at least one second wind turbine with a second sweep height, sweep heights of substantially all wind turbines between the first wind turbine and the at least one second wind turbine are sized to differ from the first sweep height and the second sweep height.

21. The apparatus of claim 20 wherein the sweep heights of substantially all wind turbines between the first wind turbine and the at least one second wind turbine are greater then the first sweep height and the second sweep height.

* * * * *